United States Patent [19]
Evanicky et al.

[11] Patent Number: 5,696,529
[45] Date of Patent: Dec. 9, 1997

[54] FLAT PANEL MONITOR COMBINING DIRECT VIEW WITH OVERHEAD PROJECTION CAPABILITY

[75] Inventors: Daniel E. Evanicky, San Jose; Leroy Bertrand Keely, Portola Valley; Steven Siefert, Belmont, all of Calif.

[73] Assignee: Silicon Graphics, Inc., Mountain View, Calif.

[21] Appl. No.: 495,082

[22] Filed: Jun. 27, 1995

[51] Int. Cl.$^6$ ........................................ G09G 5/34
[52] U.S. Cl. ............................ 345/126; 345/87; 345/102; 349/6; 349/5
[58] Field of Search .................... 345/7, 126, 102, 345/1, 87; 349/5–8, 11, 61

[56] References Cited

U.S. PATENT DOCUMENTS

| | | | |
|---|---|---|---|
| 5,206,673 | 4/1993 | Kawahara et al. | 349/6 |
| 5,404,185 | 4/1995 | Vogeley et al. | 349/6 |
| 5,568,164 | 10/1996 | Ogawa | 345/126 |

FOREIGN PATENT DOCUMENTS

| | | |
|---|---|---|
| 1316790 | 12/1989 | Japan. |
| 4149417 | 5/1992 | Japan. |

*Primary Examiner*—Richard Hjerpe
*Assistant Examiner*—Kent Chang
*Attorney, Agent, or Firm*—Wagner, Murabito & Hao

[57] ABSTRACT

A back-lit flat panel display subsystem for direct viewing as a monitor and having overhead projection capability. The display subsystem contains a removable door assembly which provides for back-lighting when configured for direct viewing. When the door assembly is removed, the active matrix LCD is semi-transparent and can be placed over (viewing surface down) the imaging screen of an overhead projector such that the LCD color image can be thus projected. The lamps that provide the back-lighting remain within the display subsystem when the door is removed so as to not disturb the power supply lines to the lamps and a unique optical junction is provided between the lamps and a light pipe within the door. The display subsystem contains a sensor detecting door presence and simultaneously shuts off the lamps and reverses the display image (to right to left) upon door removal and turns on the lamps upon door insertion and displays the image from left to right. Within the display, a conductive (grounded) anti-reflective coating is used on the flat panel display to reduce electronic emissions. The system is also portable and can operate as a stand alone peripheral or integrated within a computer system board.

27 Claims, 19 Drawing Sheets

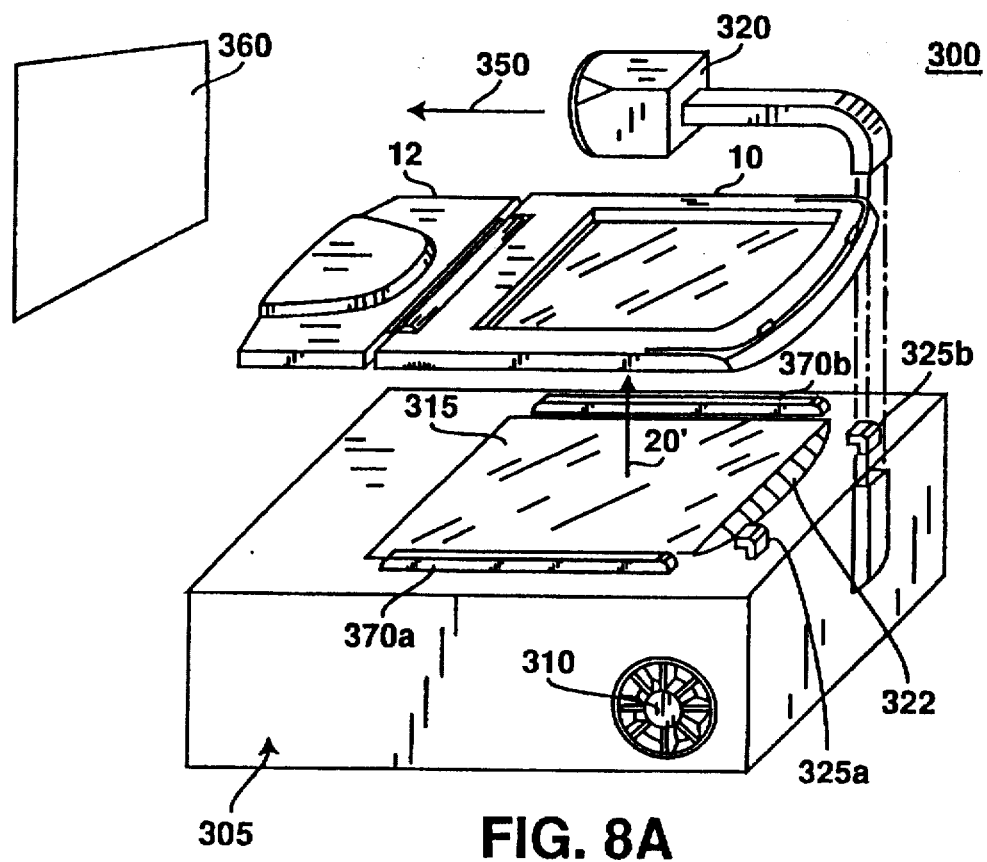
FIG. 8A
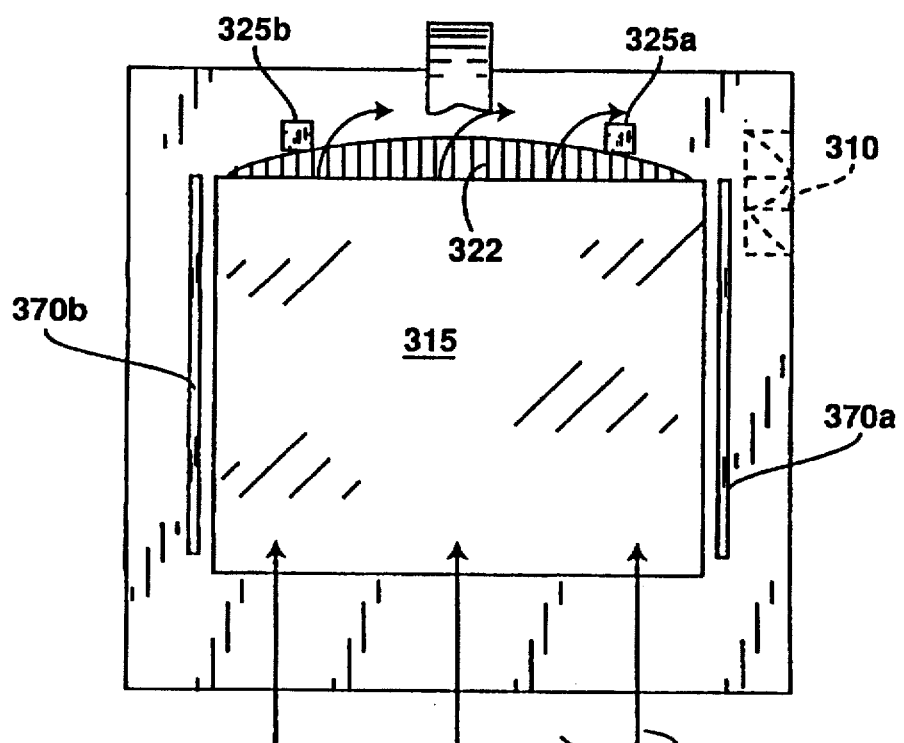
FIG. 8B — COOL AIR FLOW

FLAT PANEL MONITOR COMBINING DIRECT VIEW WITH OVERHEAD PROJECTION CAPABILITY

BACKGROUND OF THE INVENTION

1. Field of the Invention

The present invention relates to the field of information display technology for electronic devices. Specifically, the present invention relates to a display component capable of use within a computer system.

2. Prior Art

Flat panel displays or liquid crystal displays (LCDs) are popular display devices for conveying information generated by a computer system. The decreased weight and size of a flat panel display greatly increases its versatility over a cathode ray tube (CRT) display. High quality flat panel displays are typically back-lit. That is, a source of illumination is placed behind the LCD layers so that visualization of the resultant image is made much easier. However, providing a back-lit screen generally makes the display screen non-transparent. It is desired, then, to provide a LCD screen having the high quality image generation characteristics of a back-lit LCD, yet offering a transparent LCD screen. The present invention provides such advantageous capability.

During meetings and lectures, overhead projection units or "projectors" are often used to project transparent slides, foils or "overheads" onto a screen or wall. The projection and resultant enlargement of these images onto the screen allows image presentation to a large audience. With the introduction of computer systems that offer a wide range of software, including graphics packages and slide presentation capabilities, it would be advantageous to allow the graphic image output of a computer system to be projected and enlarged onto a screen for audience presentation. The present invention offers such advantageous capability.

Further, some back-lit LCD screens utilize light extraction patterns. These screens have lamps along the edges of a light pipe and depend on an extraction pattern to distribute the light intensity. The light extraction patterns of the prior art are uni-directional in that the dots vary in size only in one direction, depending on their distance from the lamp in that dimension only. As a result, in prior art back-lit displays that utilize light extraction patterns, edges and corners are often darker and the overall image is not uniformly bright. This condition requires that lights longer than the active area be used to account for the nonuniformity. It would be advantageous to provide acceptable uniform illumination of the LCD screen using lights of lower intensity (and shorter length) for power conservation. The present invention provides such advantageous functionality.

Accordingly, it is an object of the present invention to improve the versatility of a flat panel display screen. It is an object of the present invention to provide an improved flat panel display screen that can be used with an overhead projector. It is also an object of the present invention to provide a direct view flat panel display screen that is back-lit that can also be used with an overhead projector to project and enlarge a resultant display image. It is yet an other object of the present invention to provide such capability in a portable computer system or a display subsystem wherein the back-lighting components of the display subsystem are removable, thus exposing a transparent LCD screen for use in combination with the overhead projector. It is yet another object of the present invention to provide a removable door assembly as discussed above wherein the illumination sources remain within the display subsystem unit when the door assembly is removed. These, and other objects of the present invention not specifically mentioned above, will become clearer within discussions of the present invention herein.

SUMMARY OF THE INVENTION

A back-lit flat panel display subsystem is described for direct viewing as a monitor and having overhead projection capability. The display subsystem contains a removable door assembly which provides for back-lighting when configured for direct viewing. When the door assembly is removed, the active matrix LCD is semi-transparent and can be placed over (viewing surface down) the imaging screen of an overhead projector such that the LCD color image can be thus projected. The lamps that provide the back-lighting remain within the display subsystem when the door is removed so as to not disturb the power supply lines to the lamps and a unique optical junction is provided between the lamps and a light pipe within the door. The display subsystem contains a sensor detecting door presence and simultaneously shuts off the lamps and reverses the display image (to right to left) upon door removal and turns on the lamps upon door insertion and displays the image from left to right. Within the display, a conductive (grounded) anti-reflective coating is used on the flat panel display to reduce electronic emissions. The system is also portable and can operate as a stand alone peripheral or integrated within a computer system board.

Specifically, embodiments of the present invention include a display subsystem for displaying video information, the display subsystem including: (a) a display assembly for rendering the video information, the display assembly comprising: (i) a flat panel display matrix having a first surface for viewing during direct monitoring and an opposite surface for viewing during overhead projection monitoring; (ii) a light source positioned adjacent to the flat panel display matrix for providing back-light for the flat panel display matrix; (iii) a sensor for detecting when a removable door is inserted into or removed from the display assembly and for generating a control signal indicative thereof; (b) the removable door assembly adapted for insertion into and removal from the display assembly and comprising a light pipe for optically coupling with the light source for uniformly illuminating the flat panel display matrix with the back-light; and (c) a control circuit responsive to the sensor for turning the light source on and providing the video information to the flat panel display matrix in a first direction when the control signal is at a first state and for turning the light source off and providing the video information to the flat panel display matrix in a second direction when the control signal is at a second state wherein the flat panel display matrix generates an image from left to right, for the direct monitoring, when the video information is provided thereto in the first direction and wherein the flat panel display matrix generates an image from right to left, for the overhead projection monitoring, when the video information is provided thereto in the second direction. The present invention also includes a method for same.

The present invention also includes a multi-layer flat panel display screen comprising: (a) a rear polarizer for polarizing incident light; (b) a back glass structure disposed adjacent to the rear polarizer; (c) a thin film matrix for selectively polarizing light emitted through the rear polarizer, the thin film matrix comprising: (i) a transistor layer having a two-dimensional matrix of individually addressable transistors; (ii) a color filter layer; and (iii) a liquid crystal layer disposed between the transistor layer and the color filter layer; (d) a front glass structure disposed adjacent to the thin film matrix; (e) a front polarizer for polarizing light emitted through the thin film matrix; and (f) an anti-reflective and conductive layer for increasing light intensity and for reducing electromagnetic emissions, the anti-reflective and conductive layer composed of alternating layers of a dielectric layer and a transparent conductive layer, wherein the transparent conductive layers are grounded wherein the anti-reflective and conductive layer is disposed on the front polarizer.

Embodiments of the present invention also include an optical junction formed between a permanently housed light source within a display assembly and a removable light pipe when inserted into the display assembly. The optical junction is formed from a reflective film attached along the long axis of the light source and extends past a side of the light source to cover a gap between the light source and the light pipe. Another reflective strip is placed along and extends past an edge of the light pipe to bridge the gap. The reflective material is used to reflect stray light into the light pipe.

Embodiments of the present invention also include a display subsystem for displaying video information, the display subsystem comprising: (a) a display assembly comprising: (i) a flat panel display matrix having a first surface for viewing during direct monitoring and an opposite surface for viewing during overhead projection monitoring; (ii) a light source positioned adjacent to the flat panel display matrix for providing back-light for the flat panel display matrix; (iii) a sensor for detecting when a removable door is inserted into or removed from the display assembly and for generating a control signal indicative thereof; (b) the removable door assembly adapted for insertion into and removal from the display assembly and comprising a light pipe for optically coupling with the light source for illuminating the flat panel display matrix with the back-light and wherein the light source remains secured within the display assembly upon removal of the removable door assembly so that a power supply line to the light source is not disturbed upon removal of the removable door assembly and further comprising a control circuit responsive to the sensor for turning the light source on when the control signal is at a first state and for turning the light source off when the control signal is at a second state.

BRIEF DESCRIPTION OF THE DRAWINGS

FIG. 8A is a perspective illustration of the display subsystem used in a configuration with an overhead projection unit of the present invention.

FIG. 8B is a plane view of the top of the overhead projection unit of one embodiment of the present invention illustrating cooling air flow.

DETAILED DESCRIPTION OF THE INVENTION

In the following detailed description of the present invention numerous specific details are set forth in order to provide a thorough understanding of the present invention. However, it will be obvious to one skilled in the art that the present invention may be practiced without these specific details. In other instances well-known methods, procedures, components, and circuits have not been described in detail as not to unnecessarily obscure the present invention.

The present invention includes embodiments directed at an improved flat panel display subsystem that can be adapted for integration with or within a computer system. The high resolution color flat panel display has a back-lighting door assembly ("back-lighting assembly") for direct viewing. This door assembly can be removed to expose the transparent active LCD display screen. Once removed, the transparent active LCD display screen can be positioned on top of an overhead projector in order to project the displayed image in an enlarged fashion onto a receiving screen.

Figure 1A:
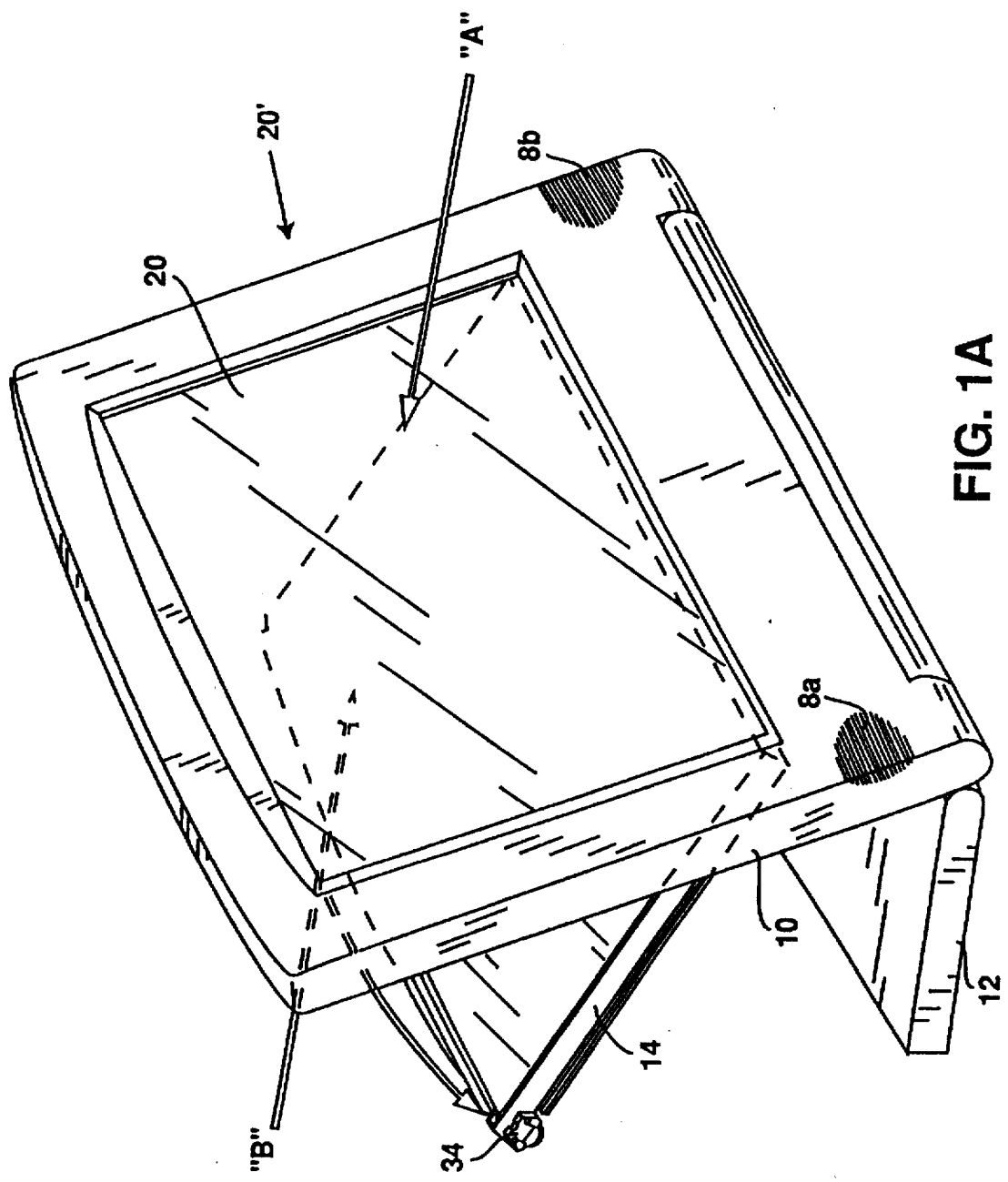
FIG. 1A is a perspective illustration of the front and side views of the display subsystem of the present invention with the direct viewing side facing outward and removal of the door assembly.

With reference to FIG. 1A, a perspective view of the display subsystem of the present invention is illustrated with the display side facing outward. This is the direct viewing configuration. Direction arrow 20' indicates the viewing direction. Light enters along "A" for projection viewing and along "B" for direct viewing. The display subsystem comprises three major assemblies. The base assembly 12 which is coupled to a display assembly 10 via a hinge in order to allow the display assembly 10 to adjust to different angles for direct monitoring or allows the display assembly to lay flat for overhead projection configurations and for storage and transportation (as will be shown in FIG. 1C). The base assembly 12 supports the display 10 for direct viewing configurations and also contains several electronic circuit systems for providing the display unit with power, audio information, and video information.

The display assembly 10 contains two stereo speakers 8a and 8b as well as an active matrix LCD color screen 20. Although many different resolutions can be utilized within the scope of the present invention, an embodiment of the present invention utilizes an LCD screen 20 having 1024 pixels by 768 pixels by RGB color and utilizes amorphous silicon thin film transistors (TFT). The LCD screen 20 is composed of color TFT-LCD panel, driver ICs, control circuitry, and power supply circuitry all contained in a rigid bezel. LCD screen 20 is capable of displaying 4096 true colors without frame rate modulation in text or graphics mode. An exemplary LCD screen 20 can be obtained by Mitsubishi Electronics as part number AA12XA4D-NDES, however, various flat panel LCD screens and screen technologies can be used within the scope of the present invention with proper configuration.

As shown in FIG. 1A, the display assembly 10 is back-lit via a separate assembly or removable door assembly 14. In this view the door is partially removed from the display assembly 10. The door assembly 14 is removed so that the display 20 can become transparent for overhead projection configurations. While inserted, the door assembly 14 provides back-lighting for the LCD screen 20 for direct viewing configurations. Although a number of lamps can be utilized, one embodiment utilizes four cold cathode fluorescent (CCF) tubes which are located within the display assembly 10 to illuminate along the top and bottom edges of a light pipe located within the door assembly 14 (as will be discussed further below) when the door assembly 14 is inserted within the display assembly 10. It is appreciated that the high voltage CCF tubes are not removed from the display assembly 10 when the door assembly 14 is removed as to not break the high voltage connection that supplies power to the CCF tubes. Also shown is a snap fit clip 34 which is used to secure the door assembly 14 to the display assembly 10.

Figure 1B:
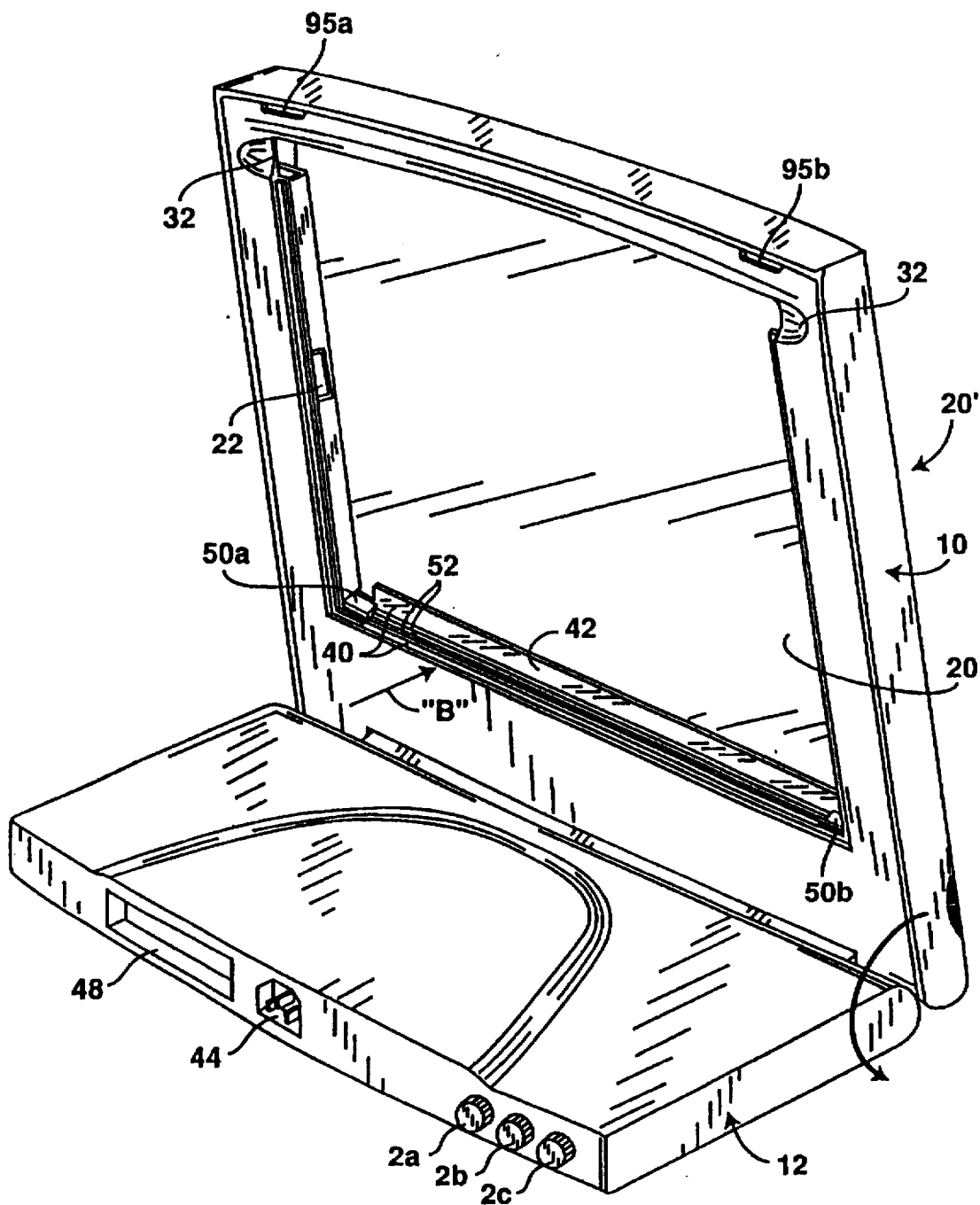
FIG. 1B is a perspective illustration of the back and side views of the display subsystem of the present invention with the back side facing outward with the door removed.

FIG. 1B illustrates the back side of the display subsystem (e.g., along "B") with the door assembly 14 completely removed to expose inner components of the display assembly 10. In this view, with the door assembly 14 removed, the back side of the LCD screen 20 is exposed. Located on the base assembly 12 are inputs for AC power 44 and an audio/video input connector 48. Power supplied to the subsystem, backlight brightness and audio volume are controlled by the computer system's software through the audio/video input connector 48. In an alternative embodiment, in addition to computer control these features can be manually adjusted. For instance, also located on the display subsystem can be (optionally) a power on switch 2a, a brightness adjustment knob 2b and a volume adjustment knob 3c for the stereo speakers 8a and 8b. The audio/video input connector 48 is coupled to the digital audio/video output of a computer system. Under one embodiment of the present invention, the computer system is capable of transmitting (UNIX) compatible digital audio/video output signals.

Located within the display assembly 10 are two lamp assemblies or housings. One lamp housing 40 is shown. Each lamp housing contains a pair of CCF lamps 52. There is a pair, as shown, on the bottom of the display assembly in lamp housing 40 and also a pair (obscured) of lamps on the top edge. Each pair of CCF lamps is mounted within its respective lamp housing using two rubber shock mounts, as shown, 50a and 50b to secure lamps 52. An identical configuration is employed for the top lamp housing (obscured). A reflective film 42 is applied to the inner portions of the lamp housings and this tape extends outside, beyond the positions of the lamps 52, for providing an optical coupling with components of the door assembly 14 when inserted. The same is true for the upper lamp housing.

Also shown in FIG. 1B are two receiving holes 32 located on the right and left sides of the display assembly 10. These receiving holes 32 fasten to corresponding latches (34 not shown) located on the door assembly 14. There is also a recess associated with these latch holes 32 for removal of the door assembly 14. Also located within this region of the display assembly 10 is a magnetic reed switch 22 that is responsive to the presence of a magnet 140 (not shown) that is located along the mating edge of the door assembly 14. Using this switch 22, the display subsystem determines whether or not the door assembly 14 is inserted or removed from the display assembly 10 and responds accordingly.

It is appreciated that the reed switch 22 and sensor, in lieu of being magnetically operated, can also be implemented using and optical sensor (or switch, such as using a LED or fiber-optic device) or a mechanical sensor (or switch, such as a toggle or spring switch).

There are also two notches 95a and 95b located on the top of the display assembly 10. These notches 95a and 95b are for mating with corresponding latches located on an overhead projector of the present invention for securing the display subsystem properly over an illuminating screen of the projector. When used in a projector configuration, the display subsystem is extended so that the base assembly 12 and the display assembly 10 are flat and the facing side of the display subsystem, as shown in FIG. 1B, is placed facing down on top of the illuminating screen of the projector. In this way, light is projected through the back side of the LCD screen 20.

Figure 1C:
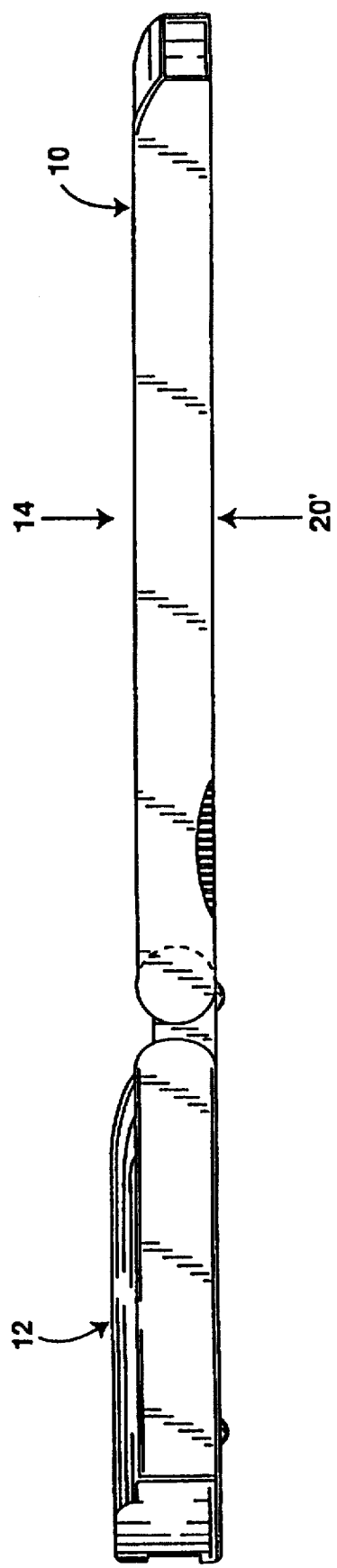
FIG. 1C is a side view of the display subsystem in the flat extended position in the overhead projection orientation.

FIG. 1C illustrates the present invention display subsystem in its flat configuration for storage or for use with an overhead projector. The base assembly 12 and the display assembly 10 are extended within a similar spatial plane. Alternatively, the base can be folded down toward the overhead projector for added stability as shown. As shown by direction 20', the viewing side of the LCD screen is facing downward. This is the overhead projection configuration. The back side 14 of the display assembly (e.g., where the door assembly 12 is inserted) is facing upward. Therefore, light passes through the LCD screen 20 in one direction for direct viewing (e.g., back-lit viewing) and through the opposite direction when used for overhead projection. This is done, as will be explained further below, because the transistor layers of the LCD screen 20 are exposed at the rear end 14 and illumination energy from the overhead projector could cause them to malfunction or become destroyed if illuminated from the rear 14. Also at issue are considerations having to do with the collumnation angle of the light coming from the overhead projector. This is covered further below with respect to FIG. 8C.

Figure 2:
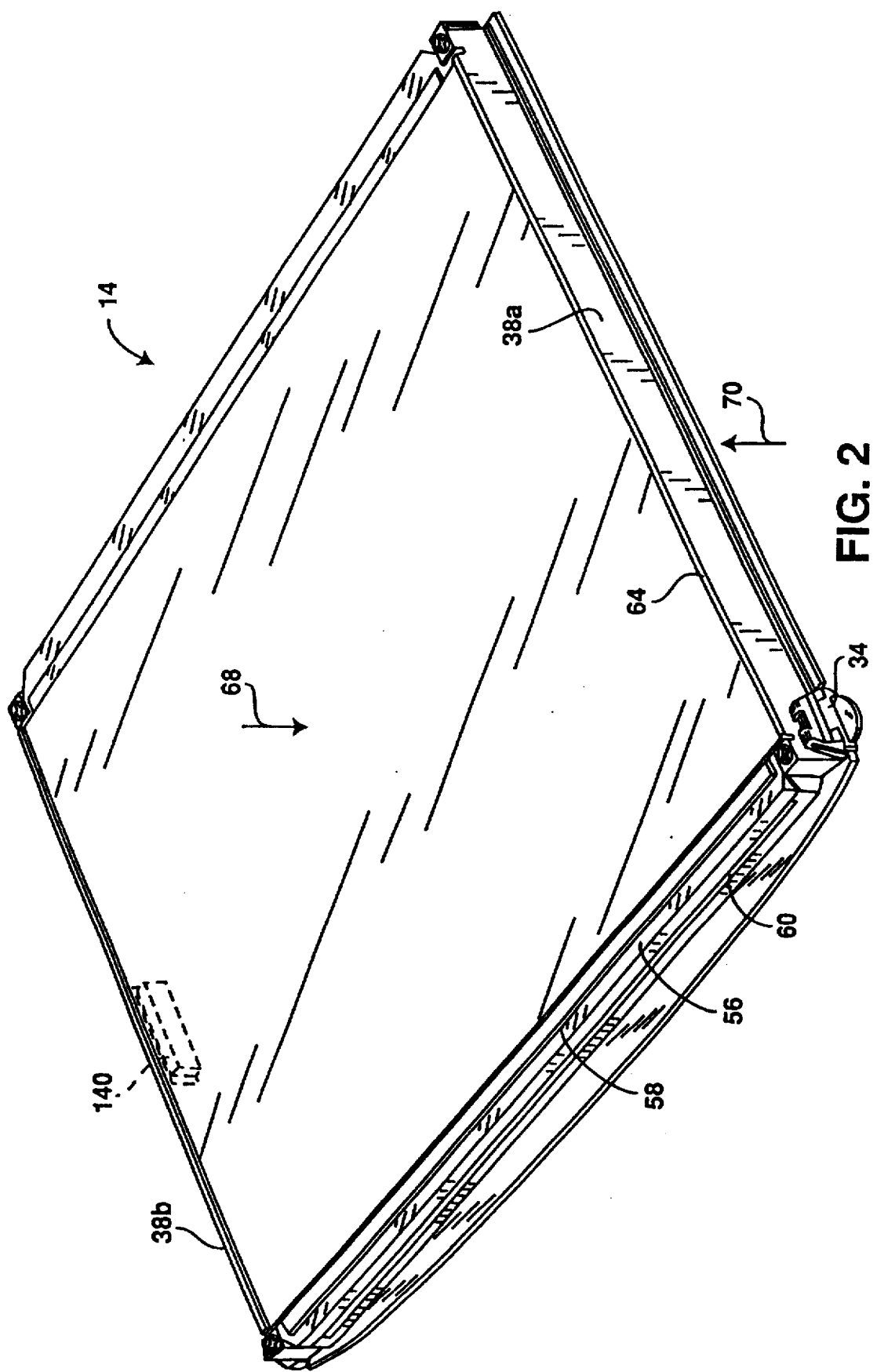
FIG. 2 illustrates a perspective view of the removable door assembly of the present invention with the viewing side facing outward.

FIG. 2 illustrates a corner view of a fully assembled door assembly 14 of the present invention. The facing side 68 of the door assembly 14, as shown, is inserted into the display assembly 10. In the configuration as shown in FIG. 2, the left illustrated side of the door assembly 14 is inserted at the top of the display assembly 10. The door assembly 14 consists of a rigid back material 70 (in one embodiment is rigid plastic) upon which is mounted an acrylic light pipe 56 which is planar having approximate dimensions to illuminate the LCD display screen 20 and is approximately 5-6 mm thick in one embodiment. As shown in FIG. 2, the light housings located on the top and bottom of the display assembly 10 mate with the left and right sides of the door assembly 14 (in the orientation of FIG. 2). The light pipe 56 distributes light from these edges throughout the active area of the LCD display 20 to illuminate the image. Located between the light pipe 56 and the back 70 is a rear reflector layer 120 (not shown in FIG. 2). Located on the surface of the light pipe 56 is a bi-directional light extraction pattern 60 (to be described in more detail to follow).

Placed on top of the light pipe 56 are several textured film layers 58 that are used to increase the intensity of light that is seen by a viewer through the LCD screen 20 and to provide other functions as will be described. The layers 58 and the light pipe 56 and other components as described above are mounted to the door back 70 with a pair of clamps 38a and 38b that each have a very small lip 64 (approximately 1-1.5 mm or less) for grabbing and holding the film and light pipe layers. The lip 64 is small because the gap between the opening in the display assembly 10 (that receives the door assembly 14) and the active display area of the LCD screen 20 is very small. The clamps 38a and 38b are fastened to the back 70 via two screws each, however, a variety of mounting techniques can be employed.

Referring to FIG. 2, located behind one of the clamps (here shown as 38b) is positioned a magnet 140. The clamp 38b is made from a non-magnetic metal as to not interfere with the interaction between the magnet 140 and the reed switch 22. When the door assembly 14 is inserted into the receiving hole of the display assembly 10, the magnet 140 aligns with the reed switch 22 to indicate the position of the door assembly 14. Also located on the outside edge of each clamp 38a and 38b, are two latches 34 for mating with receiving holes 32 located on the top of the display assembly 10. These holes 32 and clamps 38a and 38b secure the door assembly 14 to the display assembly 10. As shown, surface 68 is inserted into the display assembly 10 for back-lighting.

Figure 6:
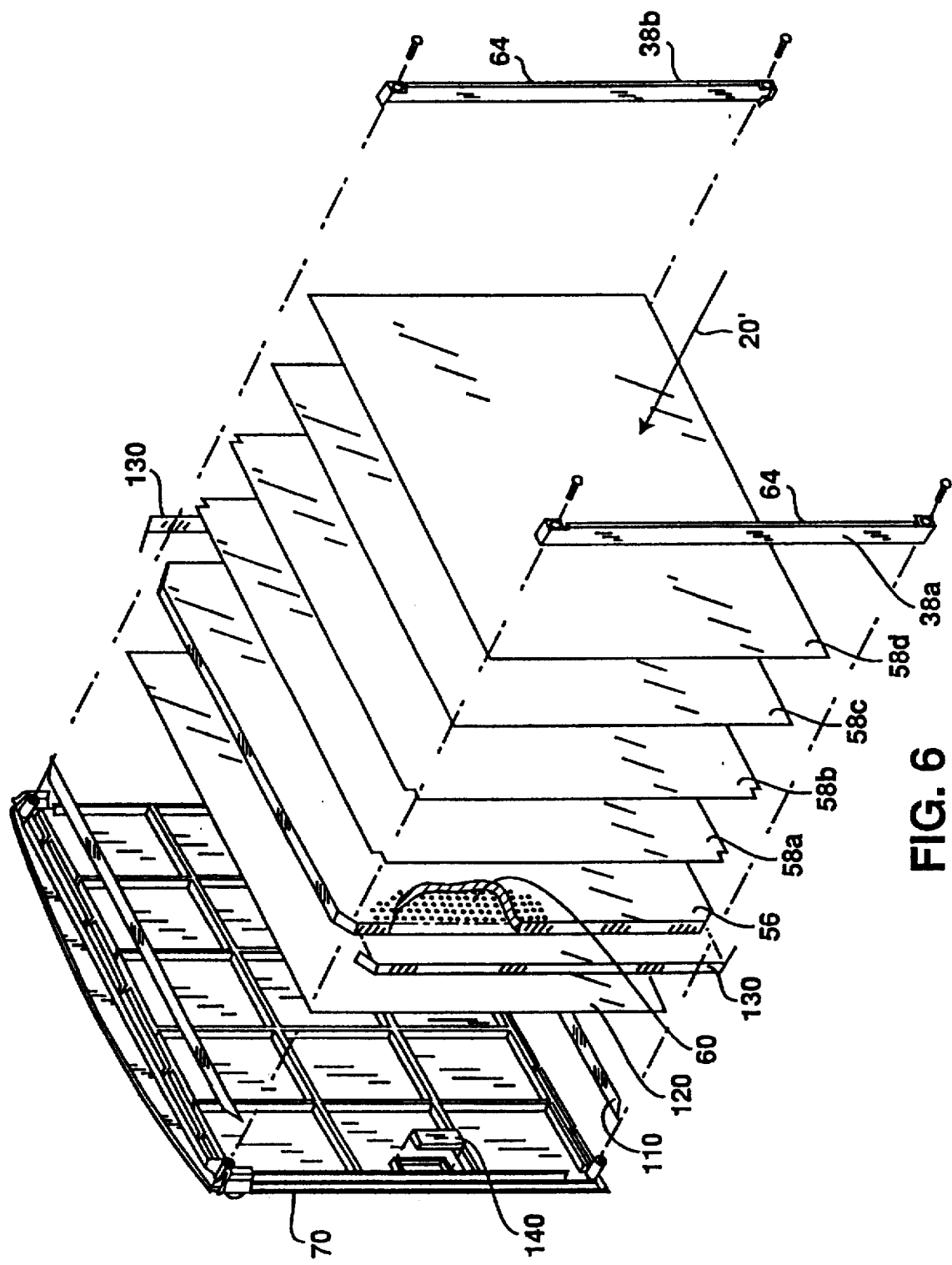
FIG. 6 illustrates the component layers of the removable door assembly of the present invention.

FIG. 6 illustrates the component layers that form the door assembly 14 in more detail. The back cover 70 is shown and the position of the magnet actuator 140 is shown mounted within the door back 70. Mounted along the top and bottom edges of the door back 70 are two shutoff reflectors 110. These reflectors 110 are used in combination with the reflective film 42 of the lamp housings 40 to create an optical junction or interface between the light pipe 56 and the lamps 52. Positioned in between the light pipe 56 and the back 70 is a rear reflector layer 120 made from a polyester reflective (e.g., white) material in one embodiment of the present invention. The purpose of this reflector is to reflect light that is extracted by the light extraction pattern 60 placed on the light pipe 56. The reflector 120 redirects all the light that is extracted to the rear and redirects it to the front of the display. Located on the edges of the light pipe 56 that do not mate with a lamp housing are two edge reflectors 130 and these are made, in one embodiment, from a polyester/silver material. These serve to redirect any light escaping to the edges back into the active area.

The dot pattern 60 is a light extraction pattern applied on the surface of the light pipe 56 that faces the rear reflector 110. This pattern, according to the present invention, is bi-directional in that the size of the light extractors varies in two dimensions to account for decreases in light intensity in both of these dimensions. This will be discussed in more detail with reference to FIG. 13. As shown in FIG. 6, the light extraction pattern can be an ultraviolet curable white screen printable material and is applied directly to the surface of the light pipe 56. As is known with light extraction patterns and light tubes, the extraction pattern functions to alter the angle of light traveling within the light pipe so that the light is scattered and will exit (e.g., become extracted) from the light pipe rather than become reflected within the light pipe. Any light incident upon any inside surface of the light pipe will pass through that surface if its incident angle is less than the Brewster angle. If its incident angel is greater than the Brewster angle (420) it will be reflected and remain within the light pipe to be rescattered again by the extraction dot pattern. The two edges and the rear of the light pipe are reflectorized so as to allow the light to be extracted only to the front (viewer) surface. When the door assembly 14 is assembled and inserted into the display assembly 10, the minimum raw surface brightness is approximately 3700 Cd/m$^2$.

The layers 58 as described with respect to FIG. 2 are shown in more detail in FIG. 6. Placed on top of the light tube 56 is an omni-directional light gain diffuser 58a for increasing the amount of light incident along the angle of a viewer and in one embodiment is manufactured from a polycarbonate material and is approximately 5-10 mils thick. On top of the light gain diffuser 58a is a diffuser layer 58b for diffusing the light. This layer 58b in one embodiment of the present invention is composed of a polycarbonate material and is approximately 5 mils thick. Its surface is of a roughened texture to insure a non-wetting contact to the rear of the brightness enhancement film BEF (58c) film. On top of layer 58b is a brightness enhancement film BEF (58c) that is composed of a polycarbonate material and is approximately 10 mils thick in one embodiment. Lastly, a BEF protector layer 58d is placed over the BEF layer 58c for protection of the layers underneath, especially the micron-sized peaks of the BEF rib structure (to protect the micron-sized tips of the BEF which are very fragile). In one embodiment, layer 58d is composed of a polycarbonate material and is approximately 20 mils thick.

These layers as shown in FIG. 6 are secured to the back 70 via stainless steel "L" shaped clamps 38a and 38b which are screwed into place. It is appreciated that the lip 64 of each clamp is very thin (approximately 1-1.5 mm). When assembled, the top and bottom edges of the light pipe 56 of the door assembly 14 are exposed for receiving light from the lamp housings 40 of the display assembly 10. The viewing direction 20' for direct monitoring is also shown in FIG. 6.

It is appreciated that the door assembly 14 does not contain the lamp housings 40. This feature of the door assembly 14 is advantageous because the lamp housings 40 remain within the display assembly 10 when the door is removed. By leaving the lamp housings 40 within the display assembly 10, the high voltage interconnection required to energize the lamps is not disturbed, thus increasing the operational life of the display subsystem and reducing user exposure to the high voltage elements.

Figure 3A:
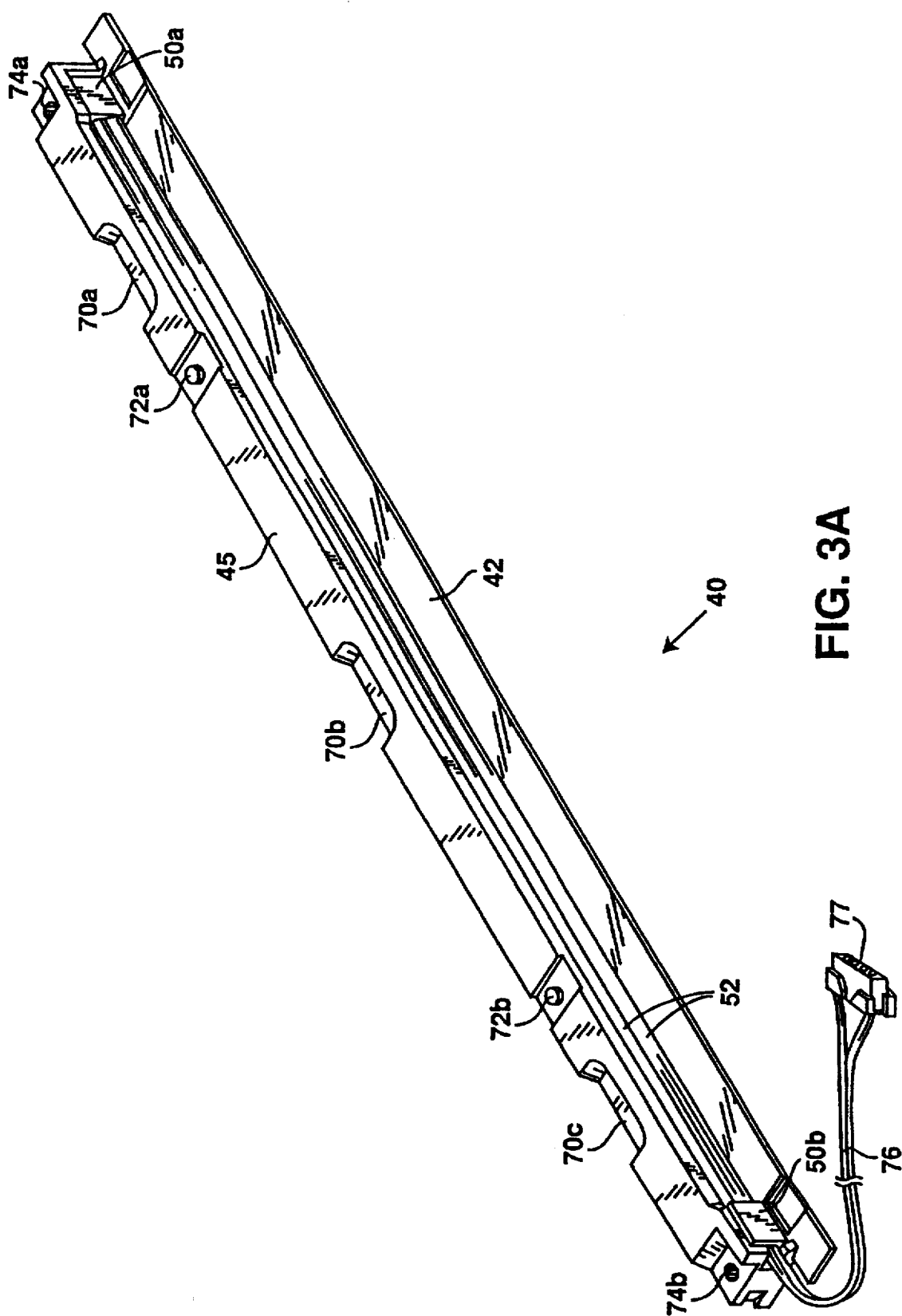
FIG. 3A is a perspective illustration of a lamp housing assembly used by the present invention.

FIG. 3A is a perspective view of a lamp housing 40 which is mounted within the display assembly 10. The housing in one embodiment of the present invention contains an outer plastic case 45 and the lamps 52 are inserted within a receiving channel of the case 45. The lamps are held in place with two elastometric shock mounts 50a and 50b as discussed before. In one embodiment, each lamp is 250 mm long and 3.0 mm in diameter. Within a given lamp pair 52, in one embodiment, the lamps are coupled in series. Reflective film 42 is placed within the channel and extends outward onto the exterior lip of the plastic case 45. The reflective film 42 and the shutoff reflectors 110 create an optical junction that is used to efficiently trap light from the lamp housings 40 within the light pipe 56. A cable 76 and connector 77 are used to supply the lamps 52 with a high voltage signal (approximately 1200 volts to initially strike the lamps, 500 volts to sustain). Recesses 70a, 70b and 70c are used to secure the lamp housing 40 to a metal containing structure 80 (shown in FIG. 4). Extended rods 72a and 72b are used to position the lamp housing within the metal containing structure for proper tolerance. The lamp housings 40 are secured to the display assembly 10 via small screws inserted in holes 74a and 74b, however, a number of different mounting techniques (e.g., snap fit, heat staking, etc.) can be used.

Figure 3B:
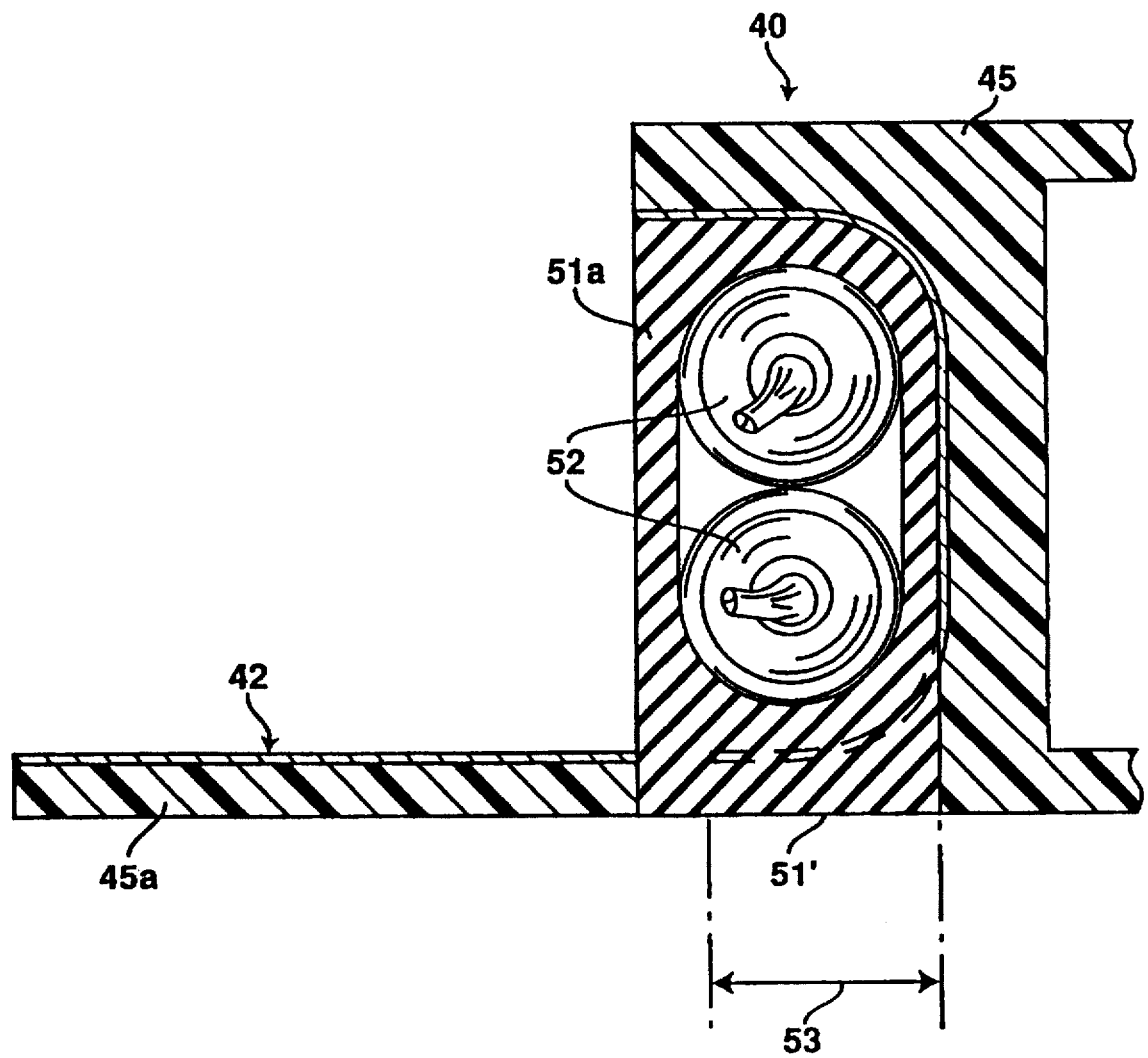
FIG. 3B is a cross-sectional view of a lamp housing assembly illustrating a shock mount and the lamps.

FIG. 3B is a cross-sectional view of the lamp housing 40 containing a shock mount 51a. The lamps 52 are shown protruding through the rubber shock mount 51a which contains a small tongue 51' which is inserted into a small receiving hole or gap 53 within the housing case 45. The same is true for shock mount 51b.

Figure 4:
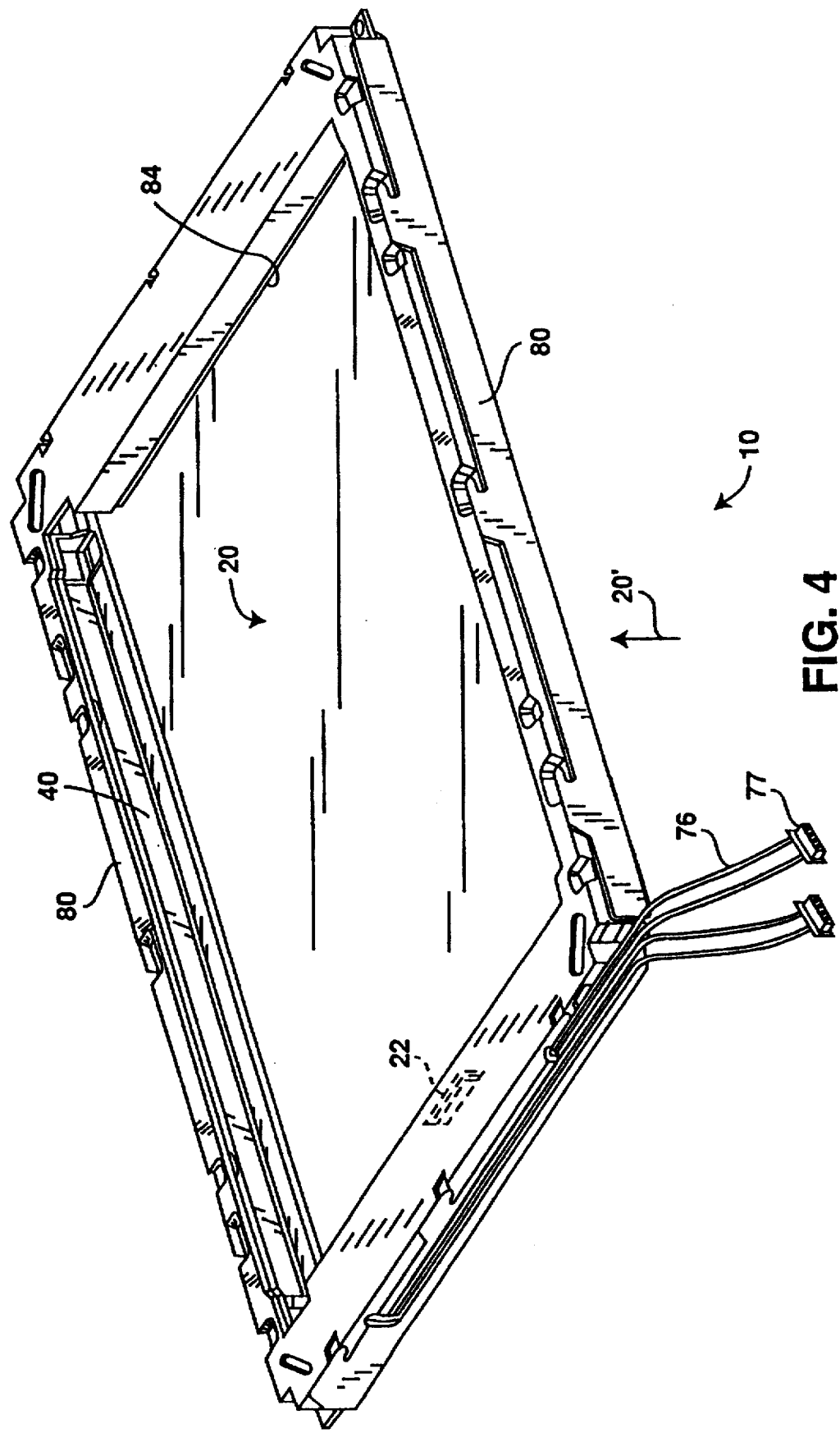
FIG. 4 illustrates the display subsystem module with its direct viewing side down and the door assembly removed to expose the lamp housings and with the plastic case removed to expose internal structural support.

FIG. 4 is a perspective illustration of the back side of a portion of the display module assembly 10 with the outer case removed and the door assembly 14 removed. The top of FIG. 4 corresponds to the top of the display assembly 10. As shown, the back side of the LCD screen 20 is facing upward. The lamp housings 40 are both surrounded by a protective metal structure 80 (bezel) which also houses the reed switch 22 and also channels voltage supply cables 76 from both lamp housings 40. The structure 80 also supports the LCD screen 20. Gap 84 illustrates the small distance between the edge of the structure 80 and the start of the active LCD display 20 region. For this reason, the lip 64 on clamps 38a and 38b are very small as to not obstruct illumination of the edge portions of the image. It is appreciated that the gap 84 should not be enlarged since it is desired to maximize the display active area as a ratio of the total size of the module. The gap 150 (FIG. 7) that is minimized is that space between the low lamp housings 52 (FIG. 7) and the entry face of the light pipe 56 (FIG. 7).

It is appreciated that the display assembly 10 in one embodiment of the present invention also contains inverter circuits required for energizing the lamps 52. This is in order to maximum power efficiency by keeping the lamp wires as short as possible to reduce capacitance coupling. However, in alternative embodiments, these circuits can also be located in the base assembly 12.

Figure 5:
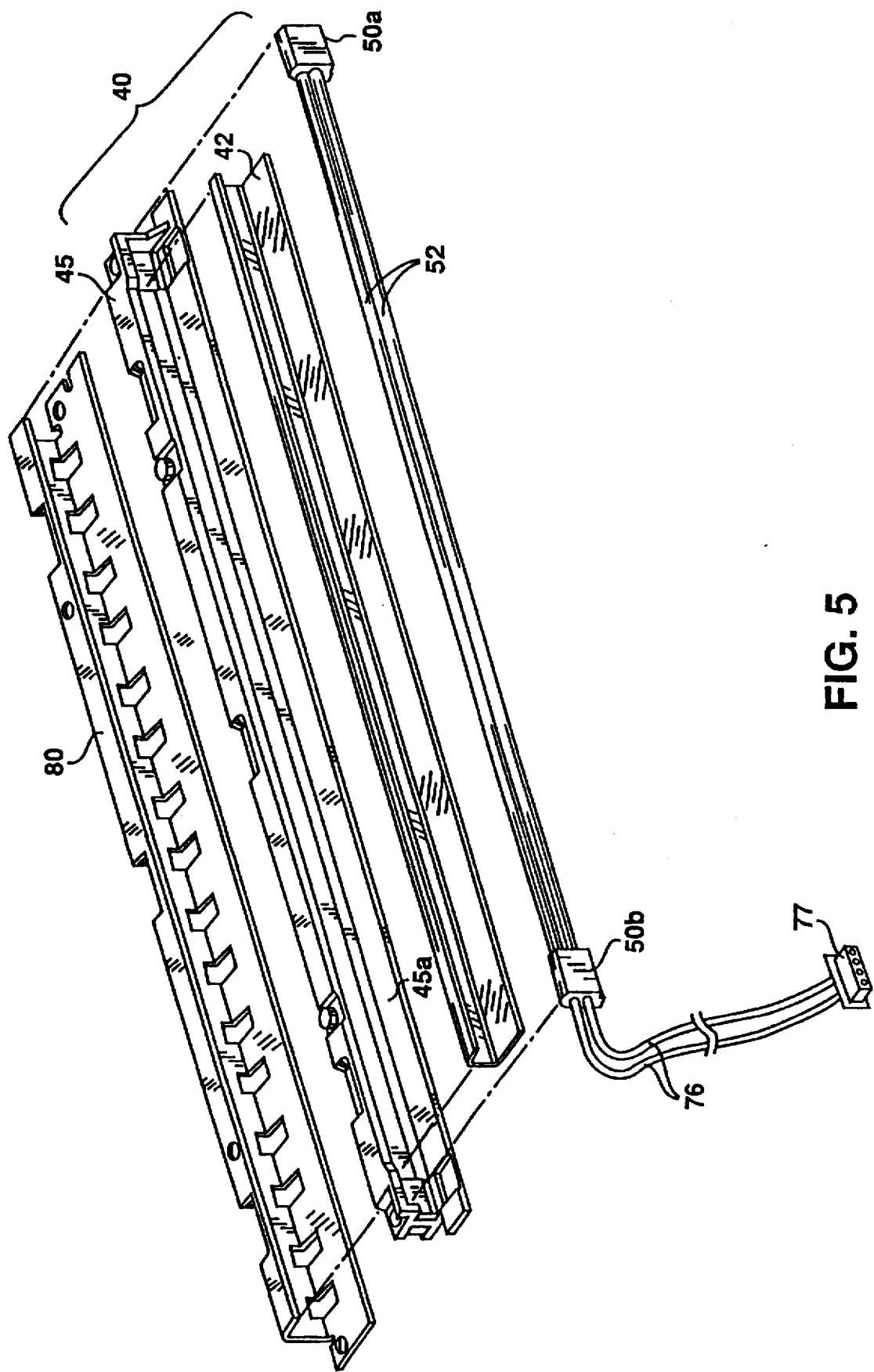
FIG. 5 is a perspective illustration of the components of a lamp housing and its reflective tape and metal EMI shield.

FIG. 5 illustrates the components of the lamp housings 40 in more detail. The plastic case 45 is inserted inside the insulated shield 80 and the reflective film 42 (curved) is inserted into the inside channel of the case 45. The function of the insulated shield 80 is to block stray electrical emissions (EMI) coming from the display driver PCB located, in one embodiment, beneath the lamp housing assembly. The lamps 52 supported by the shock mounts 50a and 50b are inserted into the case 45 and are therefore surrounded by the reflective film 42. A portion of the reflective film 42 extends outside of the channel of the case 45 onto the lip 45a. Cable 76 and connector 77 extend outside. This is true for both lamp housings 40.

Figure 7:
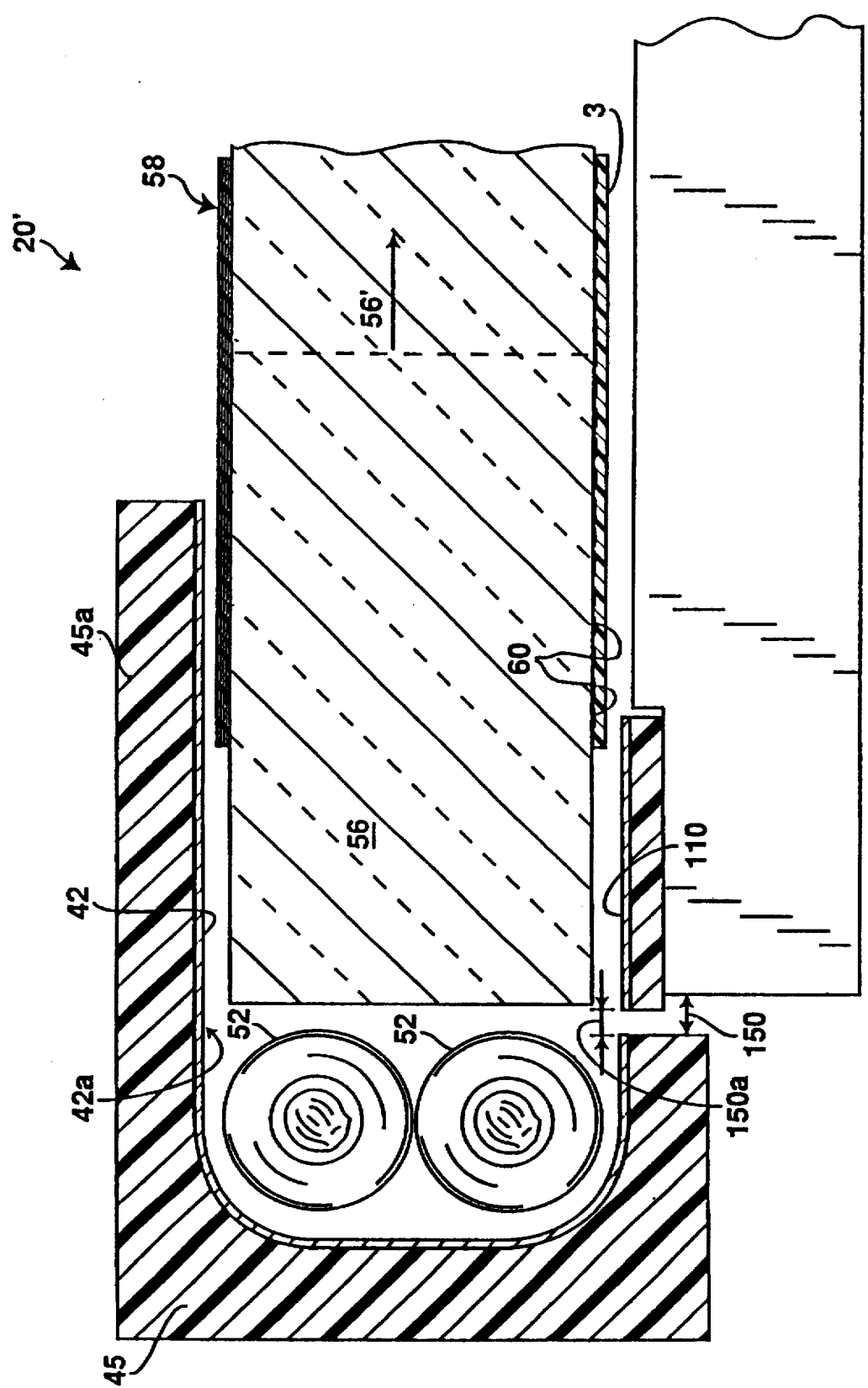
FIG. 7 is a cross-sectional illustration of the optical interface between the lamp housing and the removable door assembly of the present invention.

FIG. 7 illustrates the optical junction created by the present invention between the lamp housing (in this case the plastic case 45) and the door assembly 14 when inserted into the display assembly 10. The viewing angle for direct monitoring is shown by 20'. There is only a very small gap 150 between the end of the lamps 52 and the start of the light pipe 56. On the top of this gap 150, a portion 42a of the reflective film 42 overlaps the gap to provide reflection of light that would otherwise stray outside of the light pipe 56. This reflective film 42a directs this light back into the light pipe. On the bottom of this gap 150, as shown by FIG. 7, the shutoff reflector 110 extends over the edge of the door 14 in order to bridge the gap 110. Therefore, the gap 150a between the end of the shutoff reflector 110 and the edge of the lamps 52 is smaller than gap 150. This gap 150a is on the order of 0.25 mm. It is appreciated that the present invention advantageously provides a portion of the shutoff reflector to extend beyond the edge of the door 14 to decrease the size of gap 150a; in this manner more light is reflected back into the light pipe 56.

It is understood that gap 150 is present since the door assembly 14 is removable. The present invention minimizes this gap 150, the distance between the start of the light pipe 56 and the end of the lamps 52. The present invention further bridges the gap 150 by overhanging the shutoff reflector 110 from the edge of the light pipe 56 thus making a smaller gap 150a.

The combination of the shutoff reflectors 110 and the reflective film 42 (especially the film 42 over the lip 45a) create an optical junction that prevents light from permanently escaping out of the light pipe 56. As light is emitted from the lamps 52, those waves that enter under the Brewster angle (approximately 42 degrees) will be reflected within the light pipe 56 and will be carried down the pipe and extracted by pattern 60. Those waves (1) incident upon the light pipe at a higher angle (and hence reflected away) or those (2) waves incident directly on the reflectors, will be reflected by the reflectors 110 and 42 back into the light pipe 56 to increase light intensity for viewing. In other words, any light incident on the surface of the light pipe at greater than the Brewster angle (42 degree) is reflected off its surface to be re-reflected by the films until a percentage of the light rays enter the light pipe.

The reflective surfaces 110 and 42 are needed most at the edges of the light pipe near the lamps 52 because at this close angle, most of the light emitted is incident on the light pipe at angles greater than the Brewster angle and therefore needs to be reflected back into the light pipe 56. Therefore, since the light pipe 56 is removable from the lamp housings 40, it is appreciated that the placement of the shutoff reflectors 110 along the edge of the light pipe 56 is important to maintain the optical junction necessary to reflect light energy that is incident along an angle greater the Brewster angle. It is appreciated also that the active area of the LCD screen 20 begins approximately at line 56' which is at a distance wherein light enters under the Brewster angle and is reflected within the light pipe 56 until extracted by pattern 60.

Therefore, the optical junction (as shown in FIG. 7) created by reflectors 42 and 110 over the edge of the light pipe 56 closest to the lamps 52 reflects light that is incident on the light pipe 56 at angles greater than the Brewster angle and therefore needs to be reflected back into the light pipe 56. Any light escaping from the light pipe in that area is also redirected back into the light pipe. Since the door assembly 14, including the light pipe is removable, the shutoff reflectors 110 are mounted on the edges of the door assembly 14. Such configuration is required according to the present invention since the lamps 52 remain housed within the display assembly 10 upon removal of the door assembly 14.

Under the present invention, when the door assembly 14 is removed and inserted back, the optical junction as shown in FIG. 7 is disturbed during the removal. However, the high voltage connections between the lamps 52 and their power supply are never disturbed by the removal since the lamps 52 remain in the display assembly 10. This reduces exposure of the user to high voltage circuits and increases the operational lifetime of the display subsystem.

FIG. 8A illustrates a combination 300 including the display subsystem of the present invention (including base assembly 12 and display assembly 10) positioned over an overhead projector 305 of the present invention. In this embodiment of the present invention, the display subsystem can be a stand alone peripheral that is for coupling with a computer system. The display subsystem is in the overhead projection configuration and is placed on top of the projector 305. Although the display subsystem of the present invention may be used with a variety of well-known and commercially available overhead projectors, the projector 305 is particularly adapted for the display subsystem. This projector 305 is available from DUKANE, a corporation of Illinois, under model number 28A 681. This projector 305 generates 8000 lumens through screen 315. This amount of light intensity is utilized to take advantage of the color properties of the display subsystem. The light is of high intensity in order that the colors projected can be of high saturation while not depriving the user of the sufficient brightness to view the screen 360. It is appreciated that there is a trade off between color saturation and brightness in this invention.

On the left and right sides of the display screen 315 are mounted tracks 370a and 370b over which the display assembly 10 of the display subsystem is mounted such that the LCD screen 20 is placed over the screen 315 with the viewing side facing down (as shown by arrow 20'). An image director 320 then transfers the image from the LCD screen 20 to a receiving screen 360 (as is well-known with overhead projectors). Two clips 325a and 325b are secured to the overhead projector 305 and mate with holes 95a and 95b (FIG. 1B) to secure the display assembly 10 in proper position on the projector 305. The display subsystem is placed such that it rests over the tracks 370a and 370b and the holes 95a and 95b are inserted into the clips 370a and 370b and the viewing side of the screen 20 is facing downward.

Also shown in FIG. 8A is a fan inlet strip 322 and a fan 310. The fan 310 cools an internal lamp within the projector 305 and additionally acts to create air flow down through the inlet strip 322 in order to cool the display screen 20 as will be discussed further below. Alternatively, a pair of fans can be used to cool the lamps and the display separately.

FIG. 8B illustrates a front view down on the projector 305 with the display subsystem removed. FIG. 8B illustrates that when the display assembly 10 is positioned over tracks 370a and 370b, a channel is formed along the inside surfaces of the tracks 370a and 370b, the top surface of screen 315 and the viewing surface of the display screen 20. In this configuration, the fan 310 causes air to flow from the cool side (e.g., the top of the screen 20) and down through the air inlet strip 322. This air flow is used to cool the LCD screen 20 so that the color filters and other elements of LCD screen 20 are not damaged from the heat radiated from screen 315 when the projector 305 is turned on and the liquid crystal material is kept within its proper operating temperature. It is important that this cooling function take place when the display subsystem is used with projector 305 due to the high intensity (e.g., 8000 lumens) screen 315. It is appreciated that such air flow may not be required when the display subsystem is used with other, conventional overhead projectors of lower light intensity.

Figure 8C:
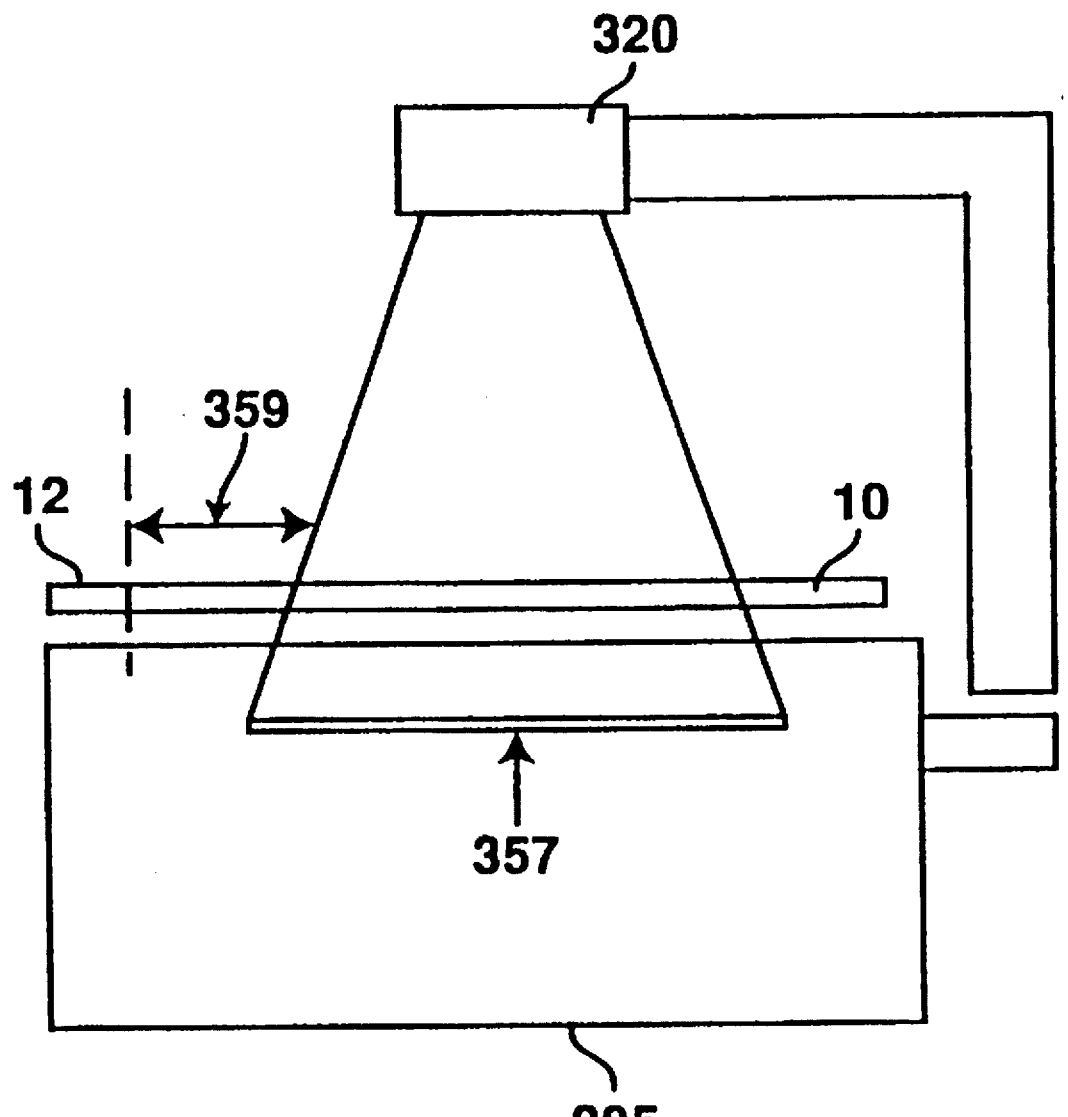
FIG. 8C is a side view of the overhead projection unit and the display subsystem thereon to illustrate the aspects of the present invention that address the effects of the collumation angle.

FIG. 8C illustrates another advantage obtained by the present invention in placing the display subsystem face down on the projector 305. FIG. 8C illustrates a side view of the projector 305 and subsystem 10 arrangement. An integral optical element of the overhead projector 305 is a fresnel lens 357 located immediately below the projector stage glass (see element 315 of FIG. 8A). This lens concentrates light received from the projection lamps and focuses it through the image residing within the LCD plate 20 onto the projection lens head 320. In doing so, the light is taken from a large area and focused onto a small area creating an optical condition known as a collumnation angle.

This collumnation angle 359 can be as acute as 21 degrees or more. Therefore, in order to view the image in the LCD screen 20 completely, all the light along this path (as shown) should be free of obstruction. By the nature of the construction of the display subsystem, the LCD screen 20 resides to the front or top of the case 10 in order to be best seen in the direct view mode. However, the back light is contained in a rather deep cavity in the rear. If one were to place the subsystem 10 over the projection 305 with the back of this cavity down against the stage 315, the close proximity of the sides of the backlight cavity would be within this 21 degree collumnation angle and would obscure the edges of the image. As a result, the present invention configuration places the display face down on the stage 315 in order to reverse the effects of the collumnation angle. The data reversal feature of the present invention then compensates for this configuration so that the image is viewed in the proper orientation.

Figure 9A:
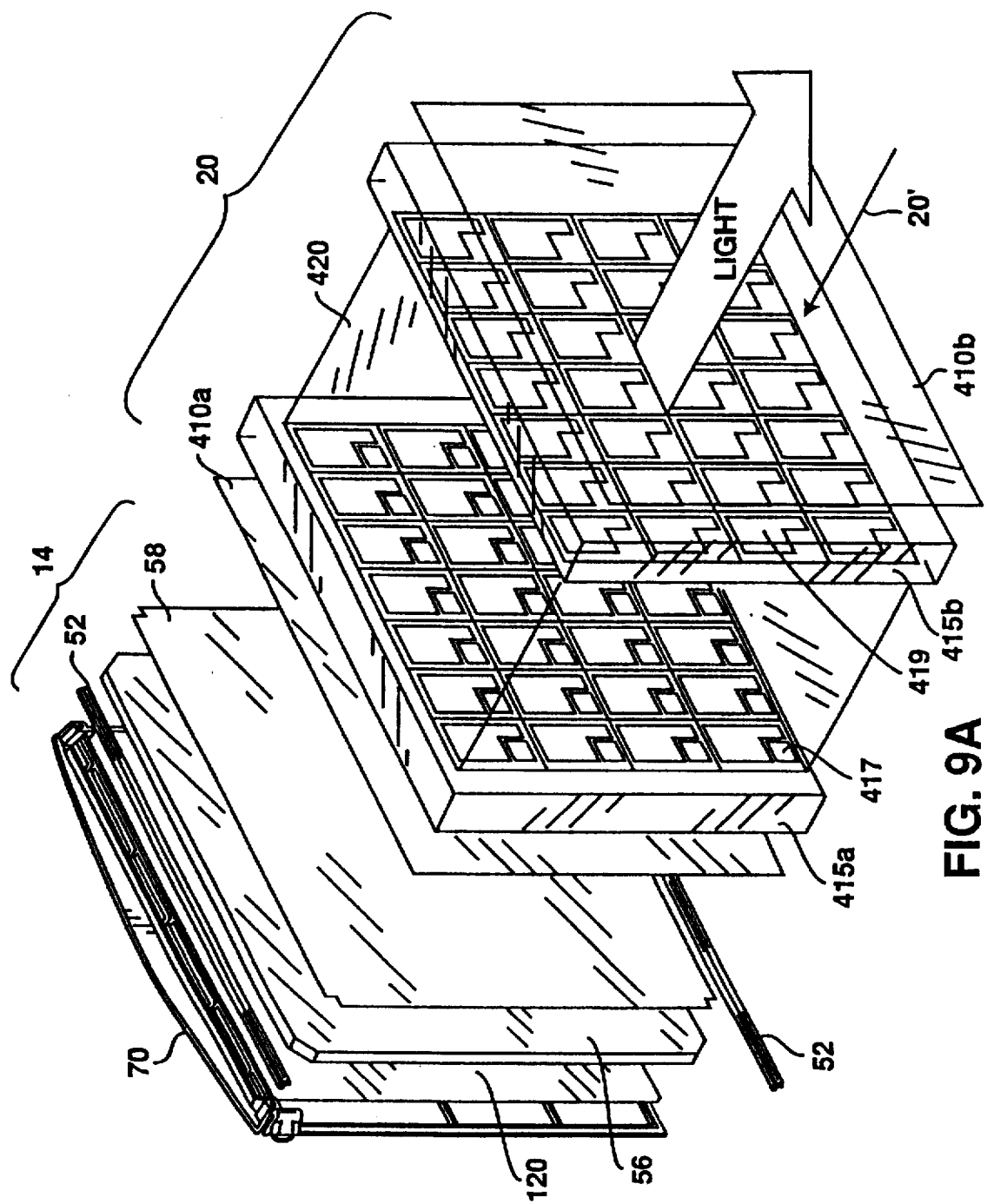
FIG. 9A illustrates the back-lit LCD of the present invention including the active matrix and the removable door assembly.

FIG. 9A illustrates the various material layers used in the present invention combining the LCD display 20 and the door assembly 14. As previously discussed, the door assembly 14 is composed of the back cover 70, rear reflector 120, light pipe 56 (with extraction pattern 60), and top layers 58. Although not part of the door assembly 14, the lamp pairs 52 are shown. Door assembly 14 is shown in its orientation when inserted into the display assembly 20.

FIG. 9A also illustrates the layers of the LCD screen 20. It is appreciated that a number of different LCD screen technologies can be advantageously used within the scope of the present invention and the particular technology shown in FIG. 9A is exemplary only. LCD screen 20 is composed of a rear polarizer 410a, a back supporting glass 415a, an active transistor layer or (TFT layer) 417, a liquid crystal layer 420, a color filter layer 419, a front supporting glass layer 415b, and a front polarizer 410b. As will be discussed further with respect to FIG. 9B, an additional layer is applied to the front polarizer. As shown in FIG. 9A, the viewing side of the LCD screen 20 is facing outward. It is appreciated that when used with the overhead projector 305, one reason the LCD screen 20 is not placed with the rear polarizer 410a side facing the screen 315 is that the light intensity from the screen 315 could damage the thin film transistor layer 417. This layer 417 has more protection when the color filter layer 419 is placed facing screen 315 in the overhead projection configuration.

Figure 9B:
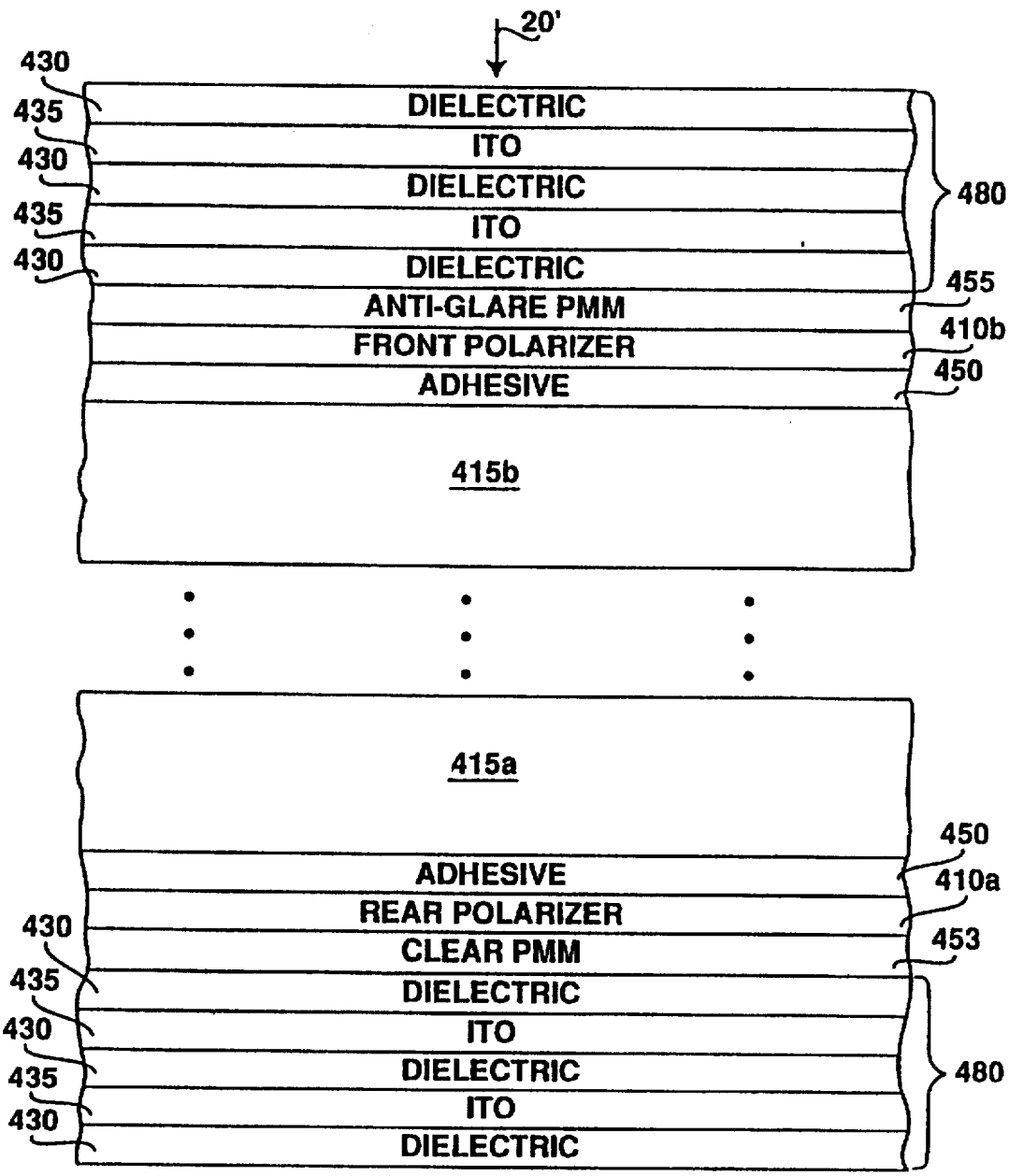
FIG. 9B is an illustration of the anti-reflective conductive layers applied within the LCD of the present invention for emissions reduction.

FIG. 9B illustrates the layers that are placed on top of the front polarizer layer 410b of the LCD display screen 20. An adhesive 450 is used to secure the front polarizer 410b to the front glass layer 415b. An antiglare layer (which can be composed of polymethyl metharcylate or PMMA) 455 is applied on top of the front polarizer layer 410b. A very thin (several hundred A°) composite layer 480 of antireflective ITC (AR/ITO) is applied on top of the antiglare layer 455. This layer 480 is composed of alternating layers of ITO 435 (composed of $In_2O_3/SnO$) and dielectric material layers 430. This is also referred to as CHEA (conductive high efficiency anti-reflection). Exemplary dielectric materials are $TiO_2$ or $SiO_2$. The ITO layer 435 is conductive and an exemplary mixture is approximately 95% In and 5% SnO. The ITO layers 435 are electrically grounded. Layer 480 performs dual functions as an antireflective layer (making the image brighter by approximately 4–5 percent per side which is in effect 10%) and as a conductor.

As shown in FIG. 9B, there is a similar structure applied to the back surface of the rear polarizer 410a, except that layer 453 is a clear PMMA layer. The ITO layers 435 of the composite layer attached to layer 453 are also electrically grounded.

Figure 9C:
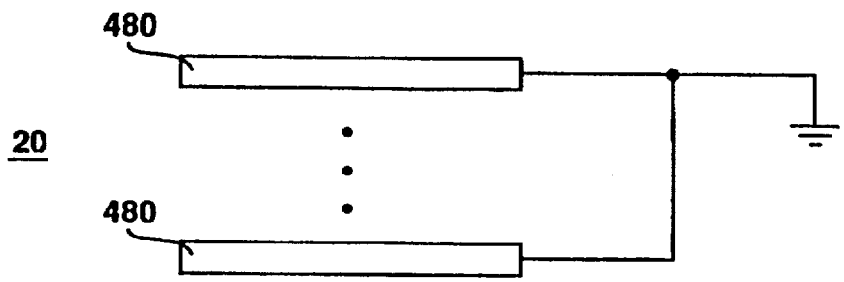
FIG. 9C is a logical block diagram of the anti-reflective conductive layers of the present invention.

FIG. 9C is an electrical diagram of the grounding of layers 480 of the LCD screen 20 in the present invention. This is done in order to reduce electromagnetic emissions from the display assembly 20 of the present invention.

Figure 10:
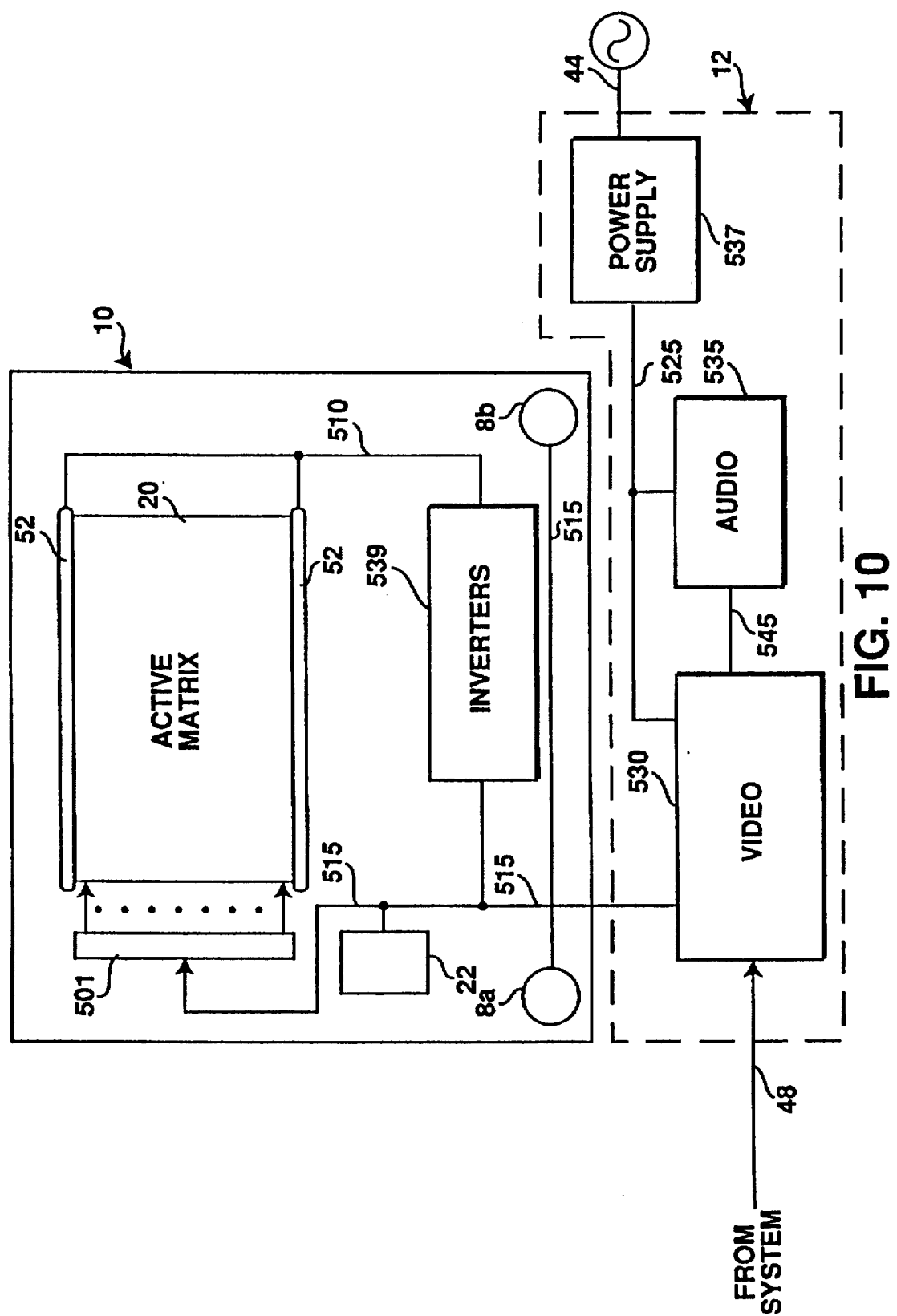
FIG. 10 is a logical block diagram of components of the present invention display subsystem.

FIG. 10 is a logical block diagram of electronics of the display subsystem of the present invention. Although some electrical components are shown (in dashed lines) to be associated with the base assembly 12 or the display assembly 10, it is appreciated that their locations are exemplary. Apart from the LCD screen 20, the actual location of the circuits could be in either the display assembly 10 or the base assembly 12.

Within the base assembly, as shown in FIG. 10, are a power supply unit 537 for coupling with an alternating current source 44. This power supply 537 supplies power via line 525 to an audio board 535 and a video board 530. The audio board 535 is coupled to the video board via bus 545. Audio and video information are sent to the display subsystem via input interconnect 48. It is appreciated that a variety of audio/video information transfer formats and standards can be used within the scope of the present invention, including an IBM compatible standard, a UNIX standard, or Apple Computer Macintosh™ standard.

Video board 530 is coupled to a bus 515 for communicating and controlling elements of the display assembly 20. It is appreciated that portions of bus 515 are composed of flex circuits so that base assembly 12 and display assembly 10 can move freely about their common hinge. Among other signals, this bus 515 carries power, control signals and audio and video data signals. The video board 530 is coupled to supply audio signals over bus 515 to stereo speakers 8a and 8b. Video board 530 also supplies a control signal and power over line 515 to a circuit block of inverters 539 which contain transformers to supply high voltage required to illuminate lamps 52 and also contain a switch circuit for turning the lamps 52 off. Lamps 52 are coupled to the inverter logic 539 via power bus 510 (high voltage bus). Bus 515 is also coupled to reed switch 22 which carries a digital signal indicating when the door assembly 14 is inserted into the display assembly 10 or not present.

Although both analog and digital data interconnects (e.g., for video and audio data from a host computer system) are within the scope of the present invention, in one embodiment of the present invention, the display subsystem utilizes a digital interface to the host computer system over interconnect 48. An adapter is present (in the host computer system) to grab the video pixel stream before it is converted to analog (to drive a CRT monitor) and to send the digital video data to the video board 530 of the display subsystem. The result is a crisp digital representation of the pixels in the frame buffer of the host computer system.

In the case of an exemplary host computer system (such as Indy™ available from Silicon Graphics of Mountain View, Calif.), there is a connector on the host computer system's graphics card which gives access to the digital pixel stream. A secondary card is installed (the adapter) and the video board 530 of the display subsystem of the present invention is coupled to that secondary card. The adapter converts the fast TTL signals (e.g., up to 110 MHz) to ECL such that the digital data can be transmitted over a long cable without degradation. The video board 530 converts this data back to CMOS to drive the LCD display 20. An exemplary interconnect 48 uses a 68 position connector to carry 24 differential pairs for each pixel (hence 24 bit color is available) in addition to the required horizontal and vertical synchronization signals.

The adapter also provides a means for the host computer system and display subsystem of the present invention to send and receive control signals via $I^2C$ interface. Using the exemplary host computer system, Indy™, the $I^2C$ interface is connected to the display control bus (DCB). The adapter also provides a pass-through circuit for line level stereo audio information from the host computer system to the speakers in the display subsystem.

Bus 515 of FIG. 10 is coupled to supply video information to column driver circuits 501. The column driver circuits 501 control information flow to the columns of each of the rows of transistors (within the TFT layer 417) of the LCD screen 20 to generate an image in the well-known fashion. (There are also separate row driver circuits that are not illustrated but operate in the well-known fashion.)

Figure 12:
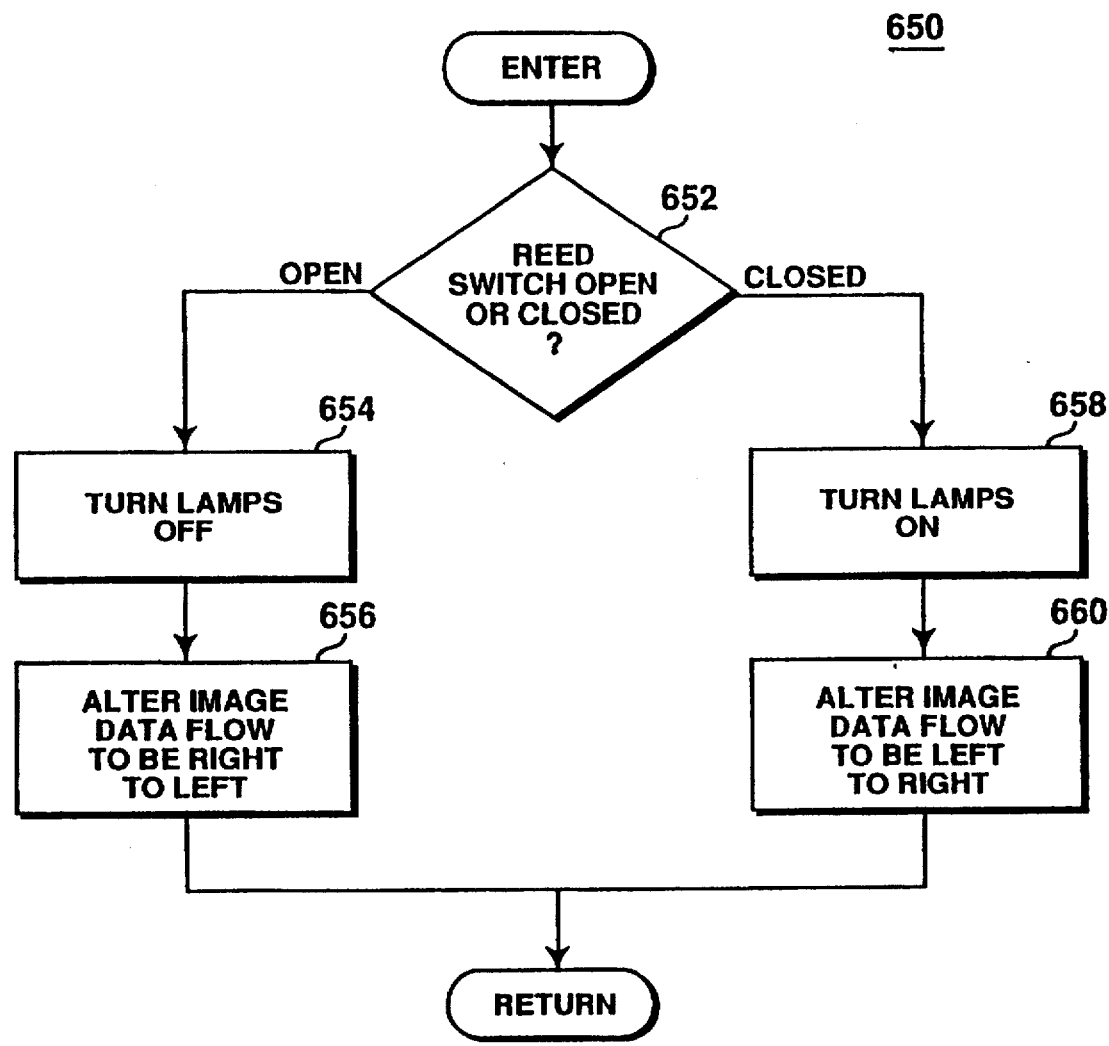
FIG. 12 is a flow diagram illustrating process steps performed by the present invention upon insertion and removal of the door assembly.

Refer to FIG. 10 and FIG. 12. The present invention performs two functions simultaneously when the door assembly 14 is removed from the display assembly 10 as shown by the flow diagram of FIG. 12 as process steps 654 and 656. The reed switch decision block is shown as block 652. Upon removal, the reed switch 22 broadcasts a signal over bus 515 which is intercepted by the video board 530. The video board 530 generates a control signal to the inverters 539 (over bus 515) causing the inverters 539 to cut off power to the lamps 52 to reduce power and reduce risk of injury when the door assembly 14 is removed. Also, a control signal is also sent over bus 515 to the column driver circuits 501 causing the column driver circuits 501 to reverse the direction of the stream of video information filled to the columns of layer 417 for the overhead projector configuration. This is done row by row to immediately reverse (left to right) the image displayed on LCD screen 20. Image reversal is required since the LCD screen 20 is viewed from opposite sides for when in direct monitoring versus overhead projection viewing.

Upon insertion of the door assembly 14 back into the display assembly 10, the reed switch 22 generates a signal over bus 515 indicating the presence of the door assembly 10 and the video board 530 generates a signal to the inverters over bus 515 to energize the lamps 52 and also generates a signal (515b shown in FIG. 11) to the row circuits 501 to reverse the information flow to LCD screen 20 for the direct viewing configuration. This is illustrated in FIG. 12 as process steps 658 and 660. It is appreciated that a number of different logic circuits can be used within the video board 530 to perform the above process, including a state machine or application specific integrated circuit (ASIC).

In the preferred embodiment of the present invention, power is controlled to the display subsystem via software control. A computer system, via a processor, a memory (RAM and ROM), and an I/O device (all coupled to a common communication bus) controls power supply 537 to control power distribution over bus 525. In an alternative embodiment, the optional power on knob 2a is coupled to the power supply 537 to control power distribution over bus 525. In the preferred embodiment of the present invention brightness and volume are also computer controlled as discussed above. In an alternative embodiment, the optional brightness knob 2b is coupled to control the voltage supplied by the inverters 539 to the lamps 52 over bus 510. In an alternative embodiment, the optional volume knob 2c can be coupled either to the audio board 535 or to the speakers 8a and 8b for volume adjustments.

Figure 11:
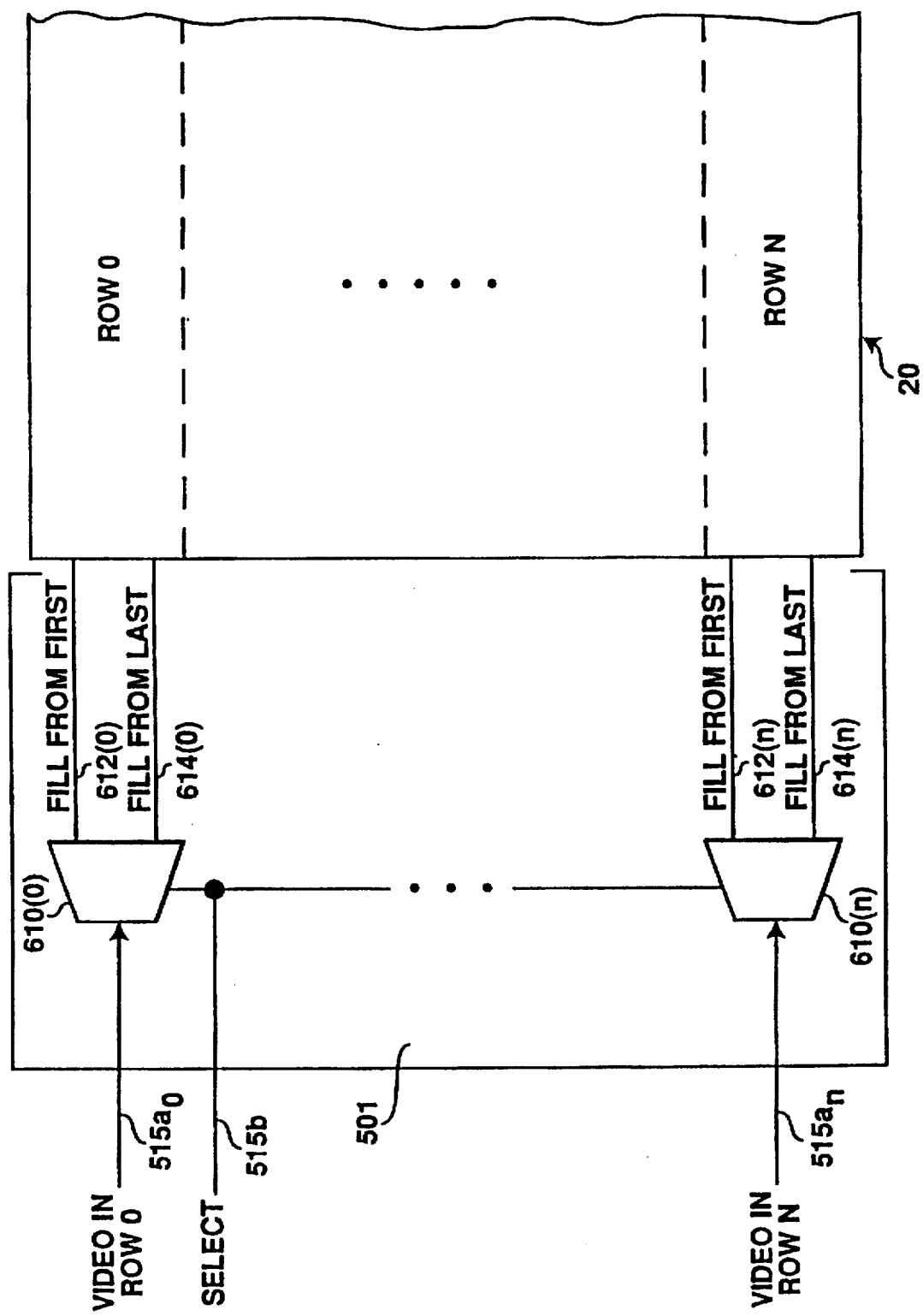
FIG. 11 is a logical block diagram of the image data fill and reversal components of the present invention display subsystem.

FIG. 11 is a logical block diagram of the circuitry within the column driver circuits 501 that control the reversal of the image data sent to the LCD screen 20 for between (1) direct viewing configuration and (2) overhead projection configuration. For each row of pixels (0 to n) of the LCD screen 20, there is a separate video input feed line 515a(0-n). These feed lines 515a(0-n) each couple to a separate multiplexing circuit of 610(0-n). The select lines for all of the multiplexing circuits 610(0-n) are coupled to control line 515b. When the reed switch 22 indicates that the door assembly 14 is within the display assembly 10, then the select line 515b asserts a signal to cause the data from the respective video in lines 515a(0-n) to be fed to the respective lines 612(0-n). These lines 612(0-n) are used by the column driver circuits 501 to send video information to the columns of the particular row (0-n). In this configuration, the columns of each row are filled from left (e.g., first) to right (e.g., last). This is used for direct monitoring configurations (e.g., back-lit).

When the reed switch 22 indicates that the door assembly 14 is removed from the display assembly 10, then the select line 515b asserts a signal to cause the data from the respective video in lines 515a(0-n) to be fed to the respective lines 614(0-n). In this configuration, the columns of each row are filled from right (e.g. last) to left (e.g., first). This is used for overhead projection monitoring configurations. It is appreciated that the signal used to control the voltage supplied from the inverters 539 to the lamps 52 can be the select signal 515b or a derivation therefrom.

Figure 13A:
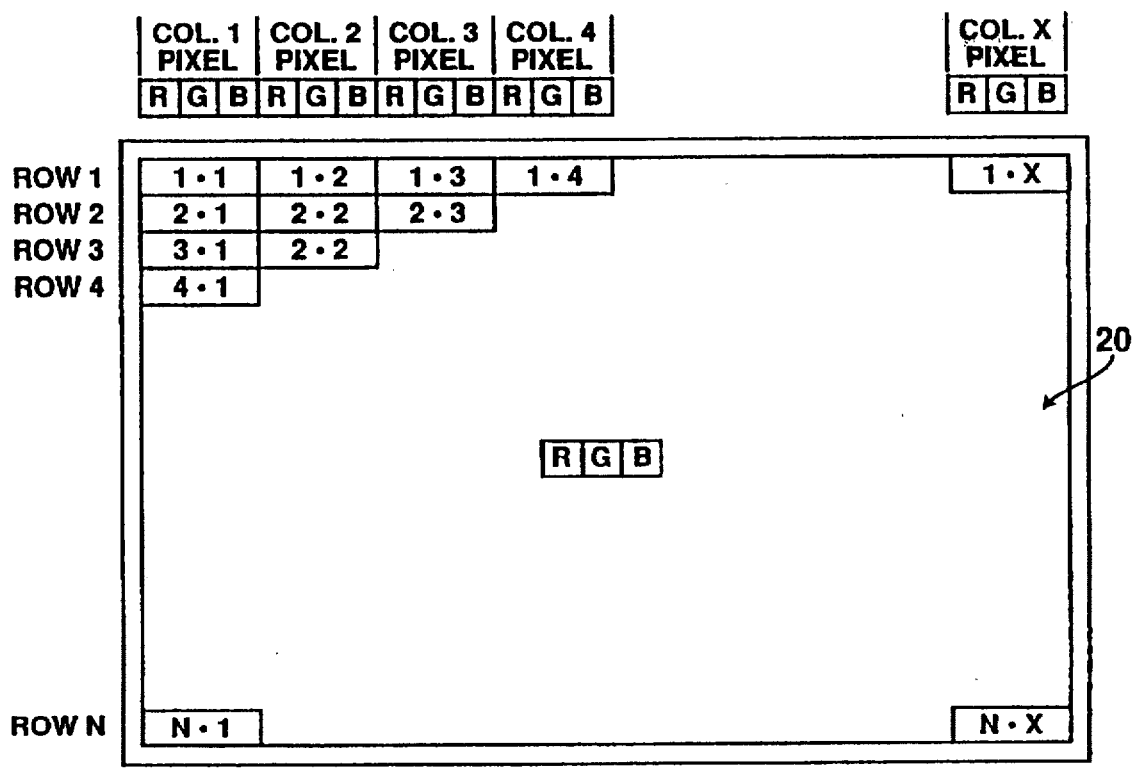
FIG. 13A illustrates forward (e.g., left to right) data fill for image generation used in direct viewing of the display subsystem of the present invention.
Figure 13B:
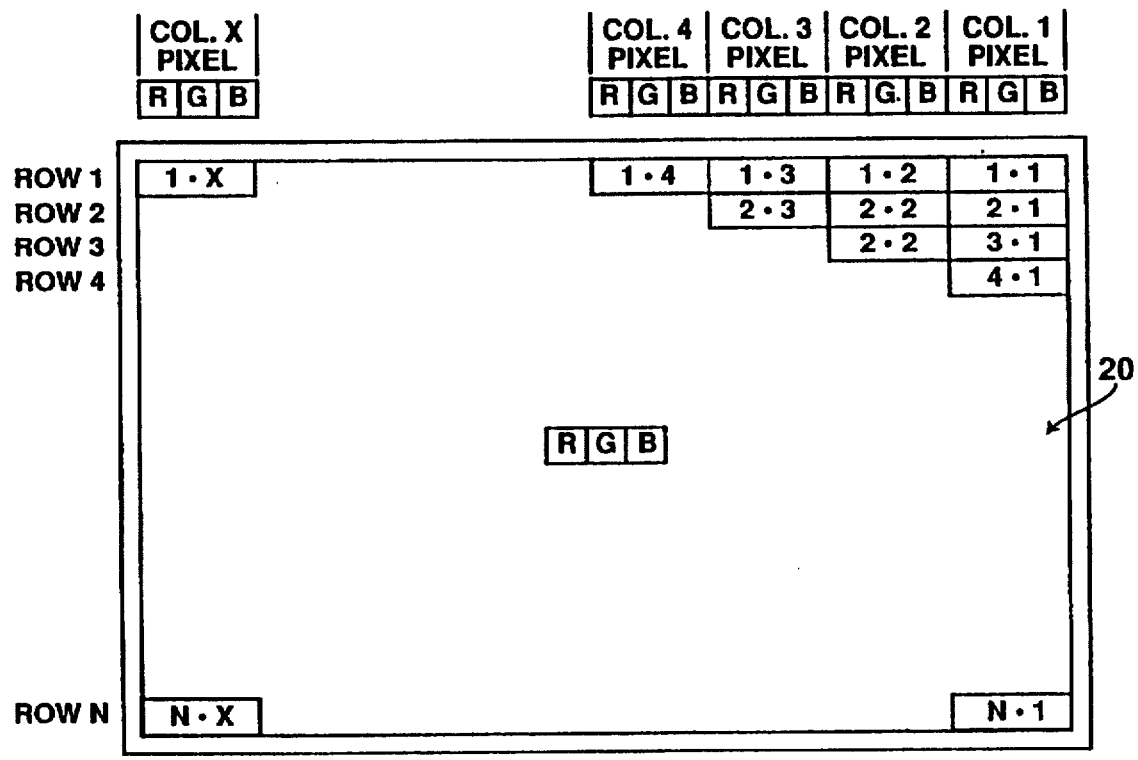
FIG. 13B illustrates reverse (e.g., right to left) data fill for image generation used in overhead projection viewing of the display subsystem of the present invention.

FIG. 13A illustrates the RGB information flow to the LCD screen 20 for a direct viewing configuration with the columns of each row being filled from left to right. In FIG. 13A, the LCD screen 20 is shown with the direct viewing side facing outward. In this exemplary screen there are n rows and x columns, each pixel described by (n, x). The data is filled for each row starting with column 1 and ending with column x. FIG. 13B illustrates the RGB information flow to the LCD screen 20 for an overhead projection viewing configuration with the columns of each row being filled from right to left. In FIG. 13B, the LCD screen 20 is shown with the direct viewing side facing outward. In this configuration, the data is filled for each row starting with column x and ending with column 1. The image is effectively reversed or "mirror imaged" under control of the select line 515b.

Figure 14:
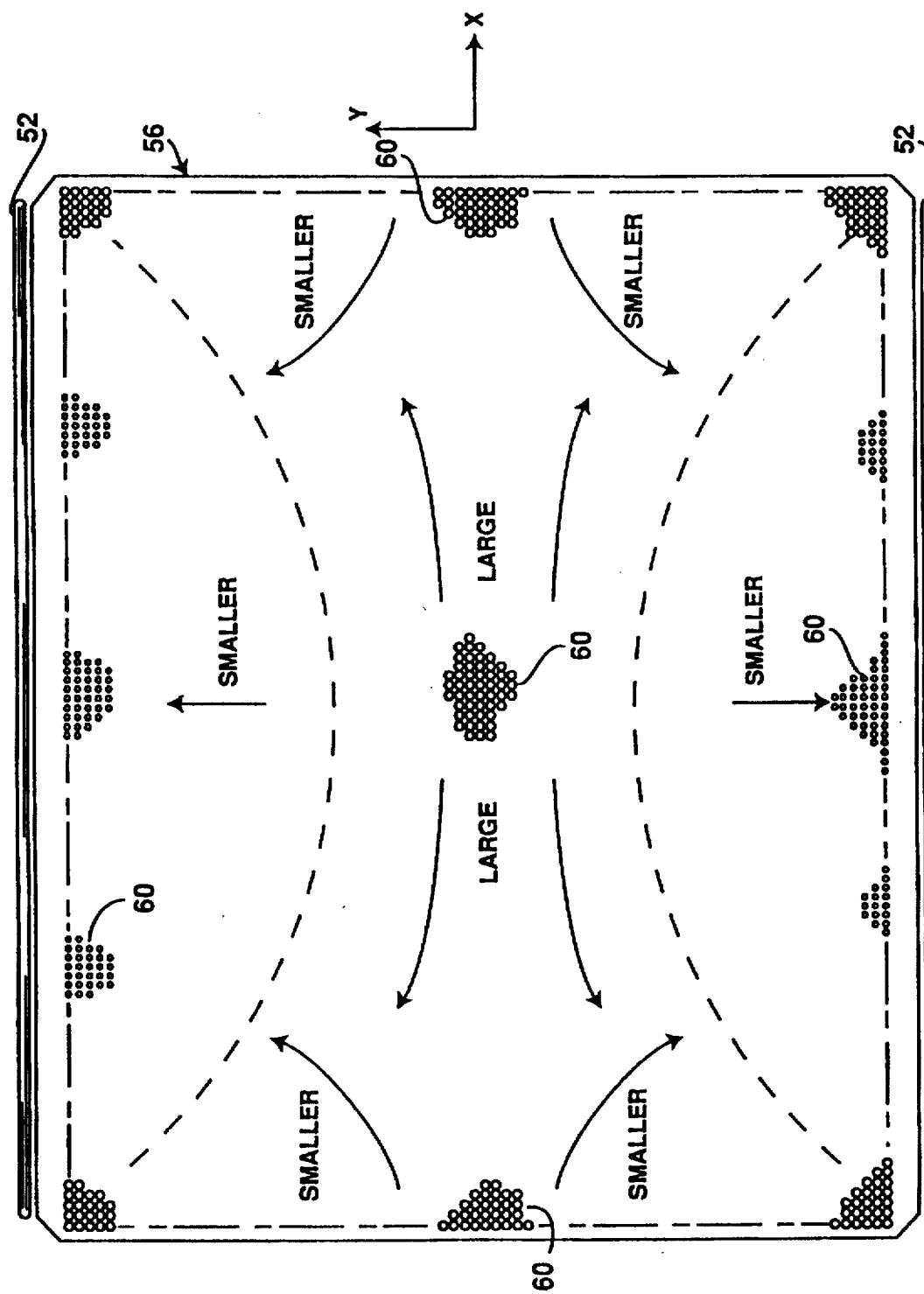
FIG. 14 illustrates a bi-directional light extraction pattern utilized by the present invention.

FIG. 14 illustrates an exemplary rendition of the light extraction pattern 60 utilized by the present invention which is applied to the light pipe 56. In the configuration of FIG. 14, the lamps 52 are oriented horizontally on the bottom and on the top to illuminate toward the center of the pattern 60. The light extraction pattern of the present invention utilizes differently sized dots along the pattern to cause light in the light pipe 56, adjacent to the dot, to alter its direction of travel. In particular, the light's direction that reflects off of a particular dot will radiate out of the light pipe 56 (e.g., it becomes extracted and is projected through the LCD display 20) unless it is extracted at an angle exceeding the Brewster angle where upon it is re-reflected within the light pipe to be extracted again by other dots. Since the light intensity is larger closer to the lamps 52, the dots nearer to each lamp are smaller. FIG. 14 shows that the dots grow larger as the distance away from a particular lamp 52 increases along the X direction.

However, since the lamps 52 are not placed along the left or right edges of the pattern, the extraction dots of pattern 60 are larger along these edges. These dots along the left and right edges grow progressively smaller (along the Y direction) the closer they become to the center of a lamp. Therefore, the extraction pattern 60 of the present invention is bi-directional in that the sizes of the dots vary in both the X and Y direction depending on the configuration of the lamps 52. Additionally, since lamps 52 do not extend completely to the corners, the light extraction dots here are larger and vary in the X and Y direction. Additionally, the lamps are not uniform across their lit area. For example, the 1.5 cm lengths (in one embodiment) at the ends of each lamp are only about 50% as bright as the center section.

By varying the sizes of the dots of the light extraction pattern 60 in a bi-directional format, the present invention light extraction pattern is able to increase the brightness of the overall image within LCD screen 20 and also provide greater uniform brightness over the image. The present invention light extraction pattern 60 effectively provides uniform light intensity even around the corners of the display and along the edges of the display that do not have corresponding lamps. It is appreciated that the dots do not necessarily have to be circular, but can be of a number of different geometries within the scope of the present invention (e.g., square, triangular or other polygonal shape).

The preferred embodiment of the present invention, a display subsystem using a back-lit flat panel display for direct viewing and also with a removable back-lit door assembly for viewing with an overhead projection unit, is thus described. While the present invention has been described in particular embodiments, it should be appreciated that the present invention should not be construed as limited by such embodiments, but rather construed according to the below claims.

What is claimed is:

1. A display subsystem for displaying video information, said display subsystem comprising:
   (a) a display assembly comprising:
   (i) a flat panel display matrix having a first surface for viewing during direct monitoring and an opposite surface for viewing during overhead projection monitoring;
   (ii) a light source positioned adjacent to said flat panel display matrix for providing back-light for said flat panel display matrix;
   (iii) a sensor for detecting when a removable door is inserted into or removed from said display assembly and for generating a control signal indicative thereof;
   (b) said removable door assembly adapted for insertion into and removal from said display assembly and comprising a light pipe for optically coupling with said light source for uniformly illuminating said flat panel display matrix with said back-light; and
   (c) a control circuit responsive to said sensor for turning said light source on and providing said video information to said flat panel display matrix in a first direction when said control signal is at a first state and for turning said light source off and providing said video information to said flat panel display matrix in a second direction when said control signal is at a second state.

2. A display subsystem as described in claim 1 wherein said control signal is at said first state when said removable door assembly is inserted into said display assembly and wherein said control signal is at said second state when said removable door assembly is removed from said display assembly.

3. A display subsystem as described in claim 2 wherein said removable door assembly further comprises a magnet and wherein said sensor is responsive to said magnet.

4. A display subsystem as described in claim 2 wherein said removable door assembly further comprises an optical mechanism and wherein said sensor is an optical sensor and is responsive to said optical mechanism.

5. A display subsystem as described in claim 2 wherein said removable door assembly further comprises a mechanical device and wherein said sensor is a mechanical sensor and is responsive to said mechanical device.

6. A display subsystem as described in claim 1 wherein said flat panel display matrix generates an image from left to right, for said direct monitoring, when said video information is provided thereto in said first direction and wherein said flat panel display matrix generates an image from right to left, for said overhead projection monitoring, when said video information is provided thereto in said second direction.

7. A display subsystem as described in claim 6 wherein said control signal is at said first state when said door assembly is inserted into said display assembly and wherein said control signal is at said second state when said door assembly is removed from said display assembly.

8. A display subsystem as described in claim 1 wherein said light source comprises a pair of light sets, each light set comprising a pair of fluorescent tubes, said pair positioned along two opposite edges of said flat panel display matrix.

9. A display subsystem as described in claim 1 further comprising a base assembly rotatably attached to said display assembly via a hinge, said base assembly and said display assembly for supporting said flat panel display matrix, said base assembly having a first configuration used for direct monitoring wherein said configuration said base assembly is rotated at a first angle with respect to said display assembly.

10. A display subsystem for displaying video information, said display subsystem comprising:
 (a) a display assembly comprising:
  (i) a flat panel display having a first surface for viewing during direct monitoring and an opposite surface for viewing during overhead projection monitoring;
  (ii) a light source positioned adjacent to said flat panel display for providing back-light for said flat panel display, said light source positioned along two opposite edges of said flat panel display;
  (iii) a sensor for detecting the presence of a removable door within said display assembly and for generating a control signal indicative thereof;
 (b) said removable door assembly adapted for insertion into and removal from said display assembly and comprising a light pipe for optically coupling with said light source for illuminating said flat panel display with said back-light, and wherein said light source remains within said display assembly upon removal of said removable door assembly; and
 (c) a control circuit responsive to said sensor for turning said light source on and providing said video information to said flat panel display to generate a first image in a first orientation when said control signal is at a first state and for turning said light source off and providing said video information to said flat panel display in a second direction to generate a second image in second orientation when said control signal is at a second state.

11. A display subsystem as described in claim 10 wherein said first orientation and said second orientation are reversed with respect to each other.

12. A display subsystem as described in claim 11 wherein said removable door assembly further comprises a magnet and wherein said sensor is responsive to said magnet.

13. A display subsystem as described in claim 11 wherein said removable door assembly further comprises an optical mechanism and wherein said sensor is an optical sensor and is responsive to said optical mechanism.

14. A display subsystem as described in claim 11 wherein said removable door assembly further comprises a mechanical device and wherein said sensor is a mechanical sensor and is responsive to said mechanical device.

15. A display subsystem as described in claim 10 wherein said control signal is at said first state when said removable door assembly is inserted into said display assembly and wherein said control signal is at said second state when said removable door assembly is removed from said display assembly.

16. A display subsystem as described in claim 10 wherein said flat panel display generates said first image from left to right, for said direct monitoring, when said video information is provided thereto in said first orientation and wherein said flat panel display generates said second image from right to left, for said overhead projection monitoring, when said video information is provided thereto in said second orientation.

17. A display subsystem as described in claim 16 wherein said control signal is at said first state when said door assembly is inserted into said display assembly and wherein said control signal is at said second state when said door assembly is removed from said display assembly.

18. A display subsystem as described in claim 10 wherein said light source comprises a pair of light sets, each light set comprising a pair of fluorescent tubes.

19. A display subsystem as described in claim 10 further comprising a base assembly rotatably attached to said display assembly via a hinge, said base assembly and said display assembly for supporting said flat panel display matrix, said base assembly having a first configuration used for direct monitoring wherein said base assembly is rotated at a first angle with respect to said display assembly.

20. A method of displaying an image for direct viewing and for overhead projection viewing, said method comprising the steps of:
 sensing whether or not a removable back-lighting assembly is present within a display assembly and generating a first signal indicative thereof, said display assembly containing a flat panel display and a pair of light sources mounted on opposite sides of said flat panel display;
 in response to said first signal being at a first state, automatically turning on said pair of light sources and also displaying said image on a viewing surface of said flat panel display from left to right; and
 in response to said first signal being at a second state, automatically turning off said pair of light sources and also displaying said image on said viewing surface from right to left.

21. A method as described in claim 20 further comprising the steps of:
 inserting said removable back-lighting assembly into said display assembly to uniformly distribute light from said pair of light sources to said flat panel display screen for said direct viewing; and removing said removable back-lighting assembly from said display assembly for said overhead projection viewing.

22. A method as described in claim 21 wherein said first signal at said first state indicates that said removable back-lighting assembly is inserted into said display assembly and wherein said first signal at said second state indicates that said removable back-lighting assembly is removed from said display assembly.

23. In a flat panel display assembly having a flat panel display matrix and a removable back-lighting assembly, a method of displaying an image for direct viewing and for overhead projection viewing, said method comprising the steps of:

sensing whether or not said removable back-lighting assembly is present within said display assembly and generating a first signal indicative thereof, said flat panel display matrix being illuminated by a source of light mounted within said flat panel display assembly;

in response to said first signal being at a first state, automatically turning on said source of light and also displaying said image on a viewing surface of said flat panel display matrix in a first orientation; and in response to said first signal being at a second state, automatically turning off said source of light and also displaying said image on said viewing surface in a second orientation.

24. A method as described in claim 23 wherein said image display on said flat panel display matrix is from left to right in said first orientation and from right to left in said second orientation.

25. A method as described in claim 24 further comprising the steps of:

inserting said removable back-lighting assembly into said display assembly to distribute light from said light source to said flat panel display matrix for said direct viewing; and removing said removable back-lighting assembly from said display assembly for said overhead projection viewing.

26. A method as described in claim 24 wherein said first signal at said first state indicates that said removable back-lighting assembly is inserted into said display assembly and wherein said first signal at said second state indicates that said removable back-lighting assembly is removed from said display assembly.

27. A method as described in claim 23 wherein said source of light comprises a pair of light sources mounted on opposite sides of said flat panel display matrix.

* * * * *